(12) United States Patent
Jiang et al.

(10) Patent No.: US 11,397,782 B2
(45) Date of Patent: Jul. 26, 2022

(54) METHOD AND SYSTEM FOR PROVIDING INTERACTION DRIVEN ELECTRONIC SOCIAL EXPERIENCE

(71) Applicant: YAHOO ASSETS LLC, Dulles, VA (US)

(72) Inventors: Junwei Jiang, Beijing (CN); Wei Li, Beijing (CN)

(73) Assignee: YAHOO ASSETS LLC, Dulles, VA (US)

( * ) Notice: Subject to any disclaimer, the term of this patent is extended or adjusted under 35 U.S.C. 154(b) by 839 days.

(21) Appl. No.: 14/436,166

(22) PCT Filed: Dec. 8, 2014

(86) PCT No.: PCT/CN2014/043245
§ 371 (c)(1),
(2) Date: Apr. 16, 2015

(65) Prior Publication Data
US 2017/0147694 A1 May 25, 2017

(51) Int. Cl.
*G06F 16/9535* (2019.01)
(52) U.S. Cl.
CPC .................. *G06F 16/9535* (2019.01)
(58) Field of Classification Search
CPC ......... G06F 17/30867; G06F 17/30899; G06F 16/9535
USPC ........................................................ 707/731
See application file for complete search history.

(56) References Cited

U.S. PATENT DOCUMENTS

| | | | |
|---|---|---|---|
| 8,732,271 B1* | 5/2014 | Burns | G06Q 30/0277 709/217 |
| 8,949,154 B2* | 2/2015 | Wetherell | G06F 16/335 705/51 |
| 9,129,008 B1* | 9/2015 | Kuznetsov | G06F 16/24578 |
| 9,230,287 B2* | 1/2016 | Filev | G06Q 10/10 |
| 9,247,015 B2* | 1/2016 | Ruffner | G06F 16/954 |
| 9,389,703 B1* | 7/2016 | Olsen | G06F 3/0346 |

(Continued)

FOREIGN PATENT DOCUMENTS

| CN | 101073094 A | 11/2007 |
|---|---|---|
| WO | 2008042837 A1 | 4/2008 |

(Continued)

OTHER PUBLICATIONS

International Search Report and Written Opinion dated Aug. 27, 2015 in International Application PCT/CN2014/093245.

*Primary Examiner* — Ashish Thomas
*Assistant Examiner* — Abdullah A Daud
(74) *Attorney, Agent, or Firm* — Venable LLP

(57) ABSTRACT

The present teaching relates to providing interaction driven electronic social experience. In one example, a request is received, via the communication platform, for providing interaction driven electronic social experience to a user, with first information associated with a first content item that the user is accessing. Second information is obtained related to activity of the user with respect to the first content item. A portion of the first content item that the user is interested in is determined based on the second information. A second content item related to the portion of the first content item is obtained. The second content item is provided with third information indicating that the second content item is to be presented with respect to the portion of the first content item.

23 Claims, 32 Drawing Sheets

(56) References Cited

U.S. PATENT DOCUMENTS

| | | | |
|---|---|---|---|
| 10,402,502 B2 * | 9/2019 | Elassaad | G06F 16/10 |
| 10,564,818 B2 * | 2/2020 | Behar | G06F 3/0484 |
| 2005/0066286 A1 * | 3/2005 | Makela | H04M 1/72445 |
| | | | 715/764 |
| 2006/0041478 A1 | 2/2006 | Zheng | |
| 2008/0086375 A1 | 10/2008 | Steck | |
| 2009/0172030 A1 | 7/2009 | Schiff | |
| 2012/0016733 A1 | 1/2012 | Belvin et al. | |
| 2012/0109739 A1 * | 5/2012 | Gupta | G06Q 30/0242 |
| | | | 705/14.41 |
| 2012/0209841 A1 * | 8/2012 | Saretto | G06F 16/784 |
| | | | 707/736 |
| 2012/0233258 A1 * | 9/2012 | Vijayaraghavan | G06Q 30/02 |
| | | | 709/204 |
| 2013/0085828 A1 * | 4/2013 | Schuster | G06Q 50/01 |
| | | | 705/14.25 |
| 2014/0156421 A1 * | 6/2014 | Burns | G06Q 30/0277 |
| | | | 705/14.73 |
| 2014/0245353 A1 * | 8/2014 | Raza | H04N 5/44543 |
| | | | 725/44 |
| 2014/0359479 A1 * | 12/2014 | Kamdar | G06Q 30/0241 |
| | | | 715/752 |
| 2015/0142888 A1 * | 5/2015 | Browning | H04L 67/22 |
| | | | 709/204 |
| 2015/0148005 A1 * | 5/2015 | Chau | H04M 1/67 |
| | | | 455/410 |
| 2015/0350029 A1 * | 12/2015 | Skrobotov | H04L 41/22 |
| | | | 715/740 |
| 2016/0048768 A1 * | 2/2016 | Liu | G06Q 30/0631 |
| | | | 706/11 |
| 2016/0086219 A1 * | 3/2016 | Richardson | G06F 16/9535 |
| | | | 705/14.53 |
| 2017/0357402 A1 * | 12/2017 | Wolters | G06F 3/0416 |

FOREIGN PATENT DOCUMENTS

| | | |
|---|---|---|
| WO | 2009085336 A1 | 7/2009 |
| WO | 2012009380 A1 | 1/2012 |

\* cited by examiner

METHOD AND SYSTEM FOR PROVIDING INTERACTION DRIVEN ELECTRONIC SOCIAL EXPERIENCE

CROSS REFERENCE TO RELATED APPLICATION

This application is a national stage application, filed under 35 U.S.C. § 371, of International Application No. PCT/CN2014/043245, filed on Dec. 8, 2014, entitled "METHOD AND SYSTEM FOR PROVIDING INTERACTION DRIVEN ELECTRONIC SOCIAL EXPERIENCE", which is hereby incorporated by reference in its entirety.

BACKGROUND

Technical Field

The present teaching relates to methods, systems, and programming for Internet services. Particularly, the present teaching is directed to methods, systems, and programming for providing interaction driven electronic social experience.

Discussion of Technical Background

The advancement in the Internet has made it possible to make a tremendous amount of information accessible to users located anywhere in the world. Effort has been made to improve user experience on a web page, by adding e.g. comments or advertisements into the web page.

Conventional approaches focus on providing all comments together in a web page. Accordingly, users have to read the comments one by one to find an interesting comment from another user. This is a heavy job especially for a user of a mobile device with a small screen. In addition, when a user is reading a long article, the user may need to memorize content at the beginning of the article to understand a comment below the article.

Therefore, there is a need to develop techniques to provide driven electronic social experience to overcome the above drawbacks.

SUMMARY

The present teaching relates to methods, systems, and programming for Internet services. Particularly, the present teaching is directed to methods, systems, and programming for providing interaction driven electronic social experience.

In one example, a method, implemented on a machine having at least one processor, storage, and a communication platform connected to a network for providing interaction driven electronic social experience, is disclosed. A request is received, via the communication platform, for providing interaction driven electronic social experience to a user, with first information associated with a first content item that the user is accessing. Second information is obtained related to activity of the user with respect to the first content item. A portion of the first content item that the user is interested in is determined based on the second information. A second content item related to the portion of the first content item is obtained. The second content item is provided with third information indicating that the second content item is to be presented with respect to the portion of the first content item.

In another example, a method, implemented on a machine having at least one processor, storage, and a communication platform connected to a network for providing interaction driven electronic social experience, is disclosed. A first content item is provided to a user on a device. First information is received. The first information is generated based on a first action of the user performed with respect to the device. A request is sent for interaction driven electronic social experience to be provided to the user, with the first information. A second action of the user is determined. Second information is determined indicating a portion of the first content item to be viewed by the user based on the second action. The second information is sent. A second content item is received with third information indicating that the second content item is to be presented with respect to the portion of the first content item. The second content item is identified based on the portion of the first content item. The second content item is provided with respect to the portion of the first content item to the user.

In yet another example, a system having at least one processor, storage, and a communication platform connected to a network for providing interaction driven electronic social experience, is disclosed. The system comprises a request receiver, an activity detection unit, an interested portion locator, a related content item generator, and a presentation instructor. The request receiver is configured for receiving, via the communication platform, a request for providing interaction driven electronic social experience to a user, with first information associated with a first content item that the user is accessing. The activity detection unit is configured for obtaining second information related to activity of the user with respect to the first content item. The interested portion locator is configured for determining a portion of the first content item that the user is interested in based on the second information. The related content item generator is configured for obtaining a second content item related to the portion of the first content item. The presentation instructor is configured for providing the second content item with third information indicating that the second content item is to be presented with respect to the portion of the first content item.

In a different example, a system having at least one processor, storage, and a communication platform connected to a network for providing interaction driven electronic social experience, is disclosed. The system comprises a content provider, a user activity detection unit, a request generator, an activity analyzer, and a related content item receiver. The content provider is configured for providing a first content item to a user on a device. The user activity detection unit is configured for receiving first information generated based on a first action of the user performed with respect to the device. The request generator is configured for sending a request for interaction driven electronic social experience to be provided to the user, with the first information. The activity analyzer is configured for determining and sending second information indicating a portion of the first content item to be viewed by the user based on a second action detected by the user activity detection unit. The related content item receiver is configured for receiving a second content item identified based on the portion of the first content item with third information indicating that the second content item is to be presented with respect to the portion of the first content item. The content provider is further configured for providing the second content item with respect to the portion of the first content item to the user.

Other concepts relate to software for implementing the present teaching on providing interaction driven electronic social experience. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable tangible and non-transitory medium having information for providing interaction driven electronic social experience, is disclosed. The information, when read by the machine, causes the machine to perform the following: receiving, via the communication platform, a request for providing interaction driven electronic social experience to a user, with first information associated with a first content item that the user is accessing; obtaining second information related to activity of the user with respect to the first content item; determining a portion of the first content item that the user is interested in based on the second information; obtaining a second content item related to the portion of the first content item; and providing the second content item with third information indicating that the second content item is to be presented with respect to the portion of the first content item.

In another example, a machine-readable tangible and non-transitory medium having information for providing interaction driven electronic social experience, is disclosed. The information, when read by the machine, causes the machine to perform the following: providing a first content item to a user on a device; receiving first information generated based on a first action of the user performed with respect to the device; sending a request for interaction driven electronic social experience to be provided to the user, with the first information; determining a second action of the user; determining second information indicating a portion of the first content item to be viewed by the user based on the second action; sending the second information; receiving a second content item identified based on the portion of the first content item with third information indicating that the second content item is to be presented with respect to the portion of the first content item; and providing the second content item with respect to the portion of the first content item to the user.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
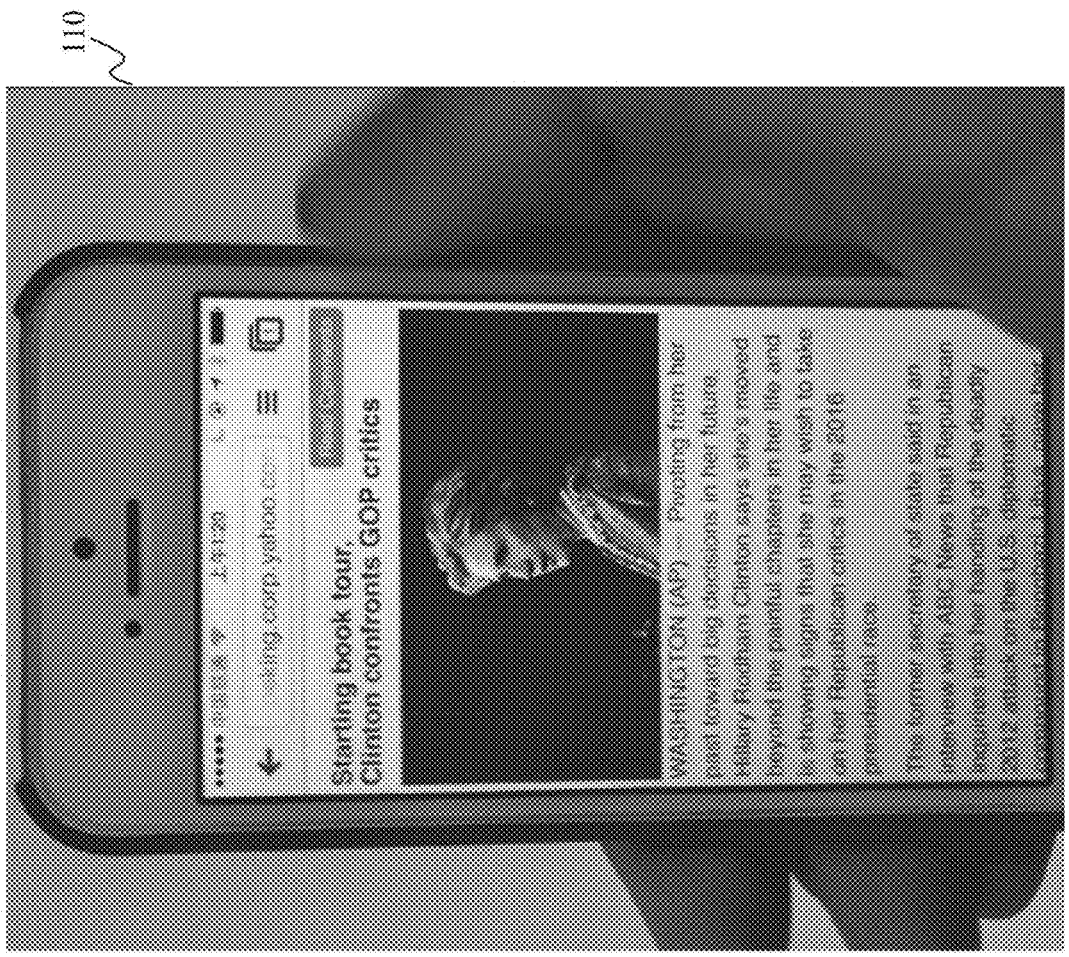
FIGS. 1A-1F illustrate providing interaction driven electronic social experience to a user, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of interaction driven electronic socialization, realized as a specialized and networked system by utilizing one or more computing devices (e.g., mobile phone, personal computer, etc.) and network communications (wired or wireless). The method and system as disclosed herein aim at providing interaction driven electronic social experience to a user. A user usually has concerns or interests on a sentence or paragraph in a document that the user is reading. This means that the user would be interested in correlative comments on a portion in the document, but not comments related to other portions in the document. Showing all comments of the document may disorder the user's reading.

The system in present disclosure may include a publisher that provides a content item, e.g. a document or a movie, to a user on a device. The publisher can detect an activity from the user with respect to a portion of the content item. For example, the publisher may detect that the user enlarges the text of a paragraph of the document, which means the user is interested in the paragraph. In that case, the system may obtain additional content items related to the paragraph and provide the additional content items to the user as well. The additional items may include a comment on the text in the paragraph, an advertisement related to the paragraph, and/or some knowledge based background information related to the paragraph.

Since the user is interested in the paragraph, he/she may be interested in these additional related items as well. An additional related item may be presented close to the paragraph. For example, a comment on the paragraph may be presented next to the paragraph, so that the user can see the paragraph and the comment at the same time. As such, the user can have a better understanding of both the paragraph and the comment, without a need to remember either of them. The additional related items can also be presented in other manners, e.g. flying over, above, or below the paragraph, in a pop-up window, or in a split window on the screen of the user's device.

The user may have a control of whether he/she can see the additional related items. For example, the system may turn on or off a presentation of the additional related items upon detecting an activity from the user. The activity may be: turning the device back and forth; rotating the device; moving the device farther away from the user; moving the device closer to the user; shaking the device; or an input from the user in form of text, voice, image, or video.

The user can also input a comment related to a portion of the document. For example, when the user wants to make a comment, he/she can double-click a sentence or paragraph. The system may provide a virtual layer for the user to input his/her comment in the layer. Then, other users can see his/her comment shortly afterwards and may make further comments regarding his/her comment. This can provide the user interaction driven electronic social experience with other users for a common interesting document, movie, or any other content items, which can improve the users' engagement and correspondingly bring higher revenue for the publisher.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1B:
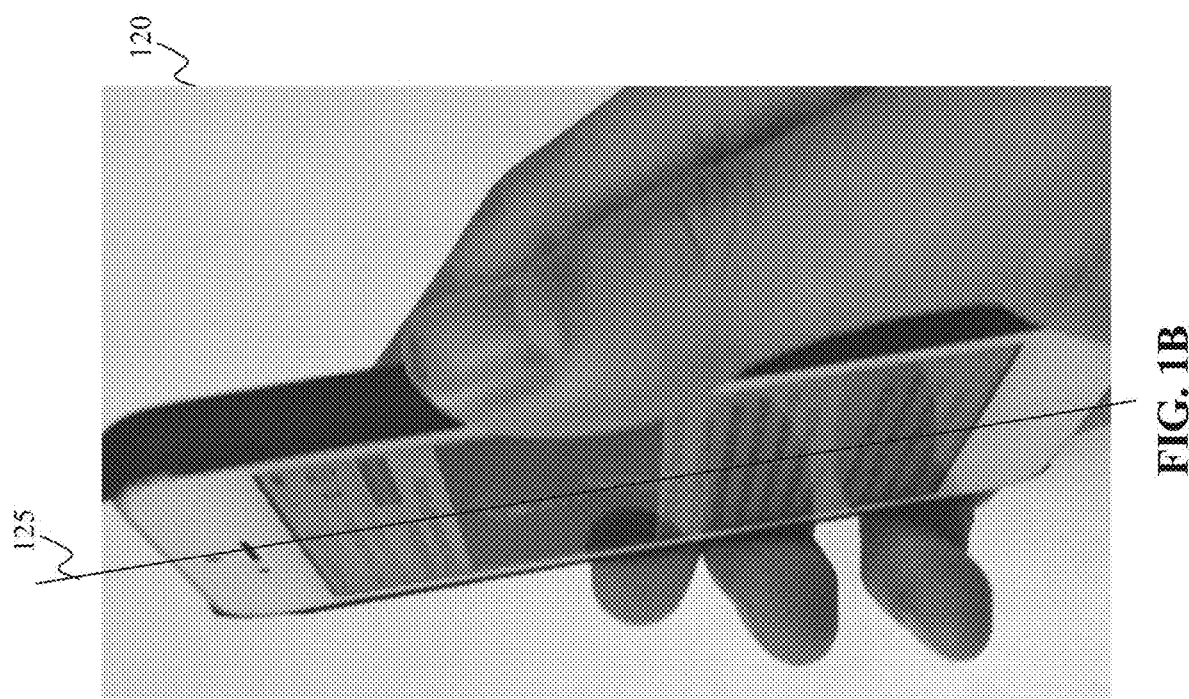
Figure 1C:
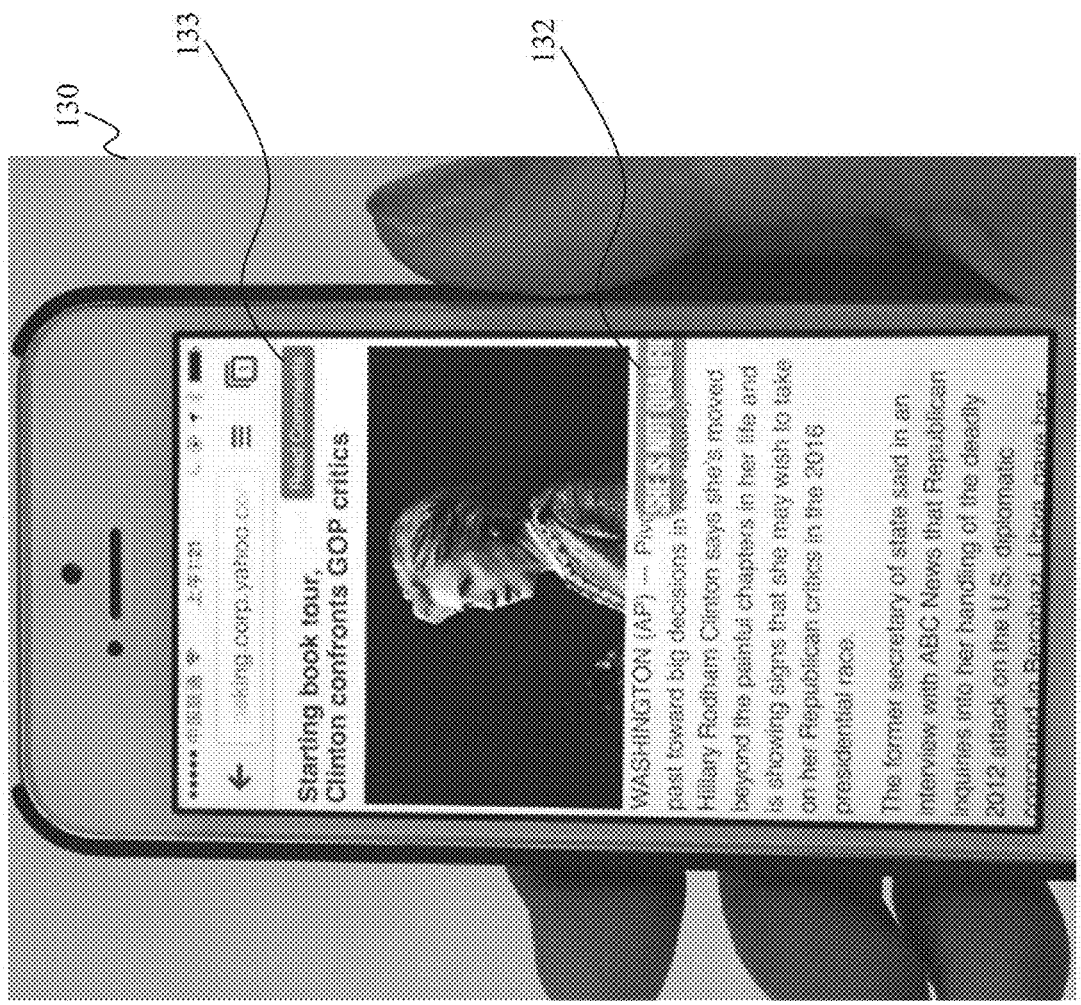

FIGS. 1A-1F illustrate providing interaction driven electronic social experience to a user, according to an embodiment of the present teaching. As shown in FIG. 1A, a user is reading a news about "Clinton confronts GOP critics" on a screen of a smartphone. At this stage 110, there is no comment showing on the screen. In FIG. 1B, the user turns the right side of the smartphone to the left, e.g. by rolling the smartphone about the longitudinal axis 125 to the left, at the stage 120. This action may activate presentation of comments from other users. As shown in FIG. 1C, after the user turns back the smartphone at the stage 130, a comment 132 is shown over the first paragraph of the news. The comment 132 may be related to the first paragraph. The comment 132 in this example is flying over the first paragraph from right to left. This may be referred as a scrolling shooter style, as in a shoot-them-up game.

As shown in both FIG. 1A and FIG. 1C, an icon "Read Comments" 133 is shown on top of the news. If the user clicks the icon "Read Comments" 133, either before or after activating presentation of the comments, the user can hear voices from the smartphone generated by some software reading the comments. The software may be text-to-speech software installed in the smartphone or at the publisher sending the news. The text-to-speech software may generate different kinds of voices (men's, women's, children's, etc) for different comments. By clicking on the icon "Read Comments" 133 and rolling the smartphone from right to left, the user can see the comments and hear voices about the comments at the same time.

Figure 1D:
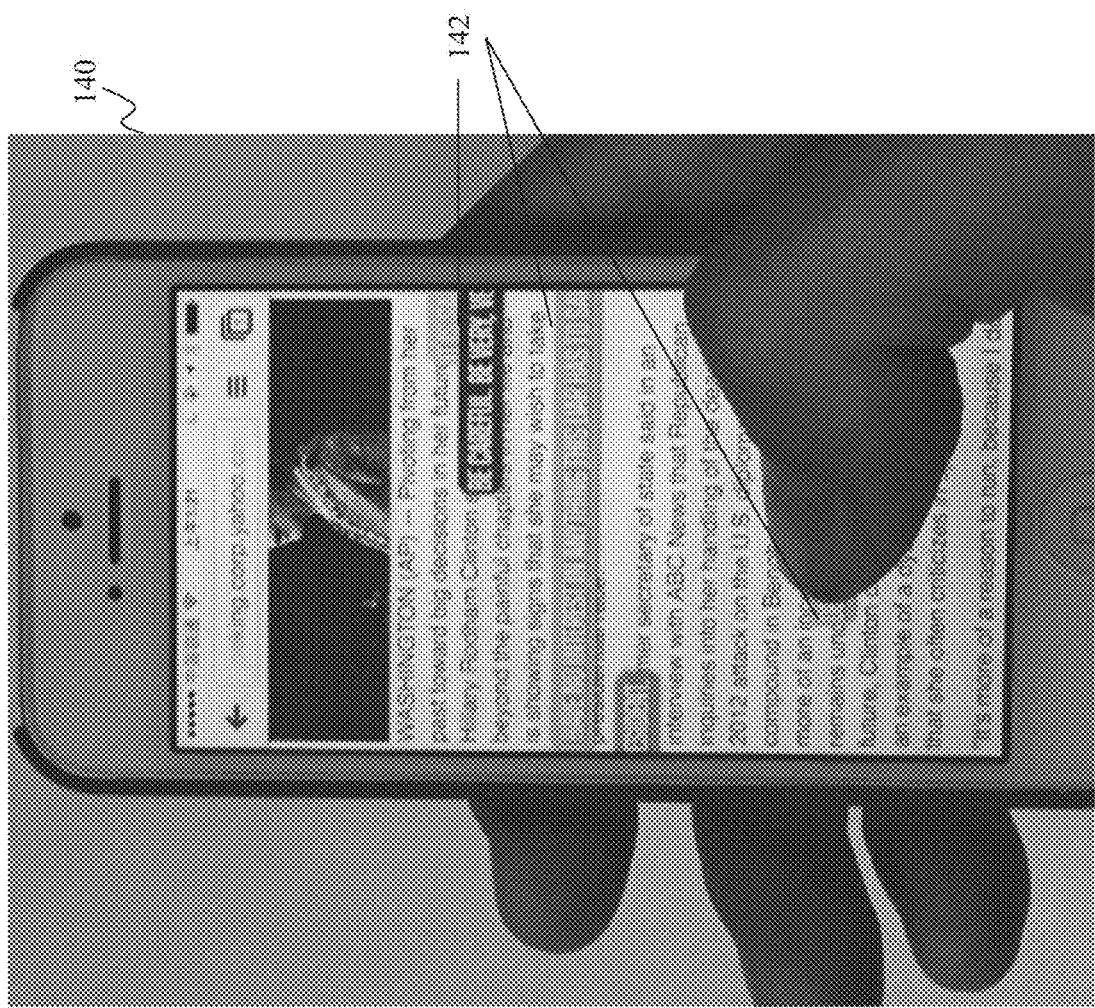

As shown in FIG. 1D, more comments 142 are presented on the screen, at the stage 140. Each of the comments 142 is presented at a location close to the text having a relationship to the comment. The relationship may be determined by the publisher and/or identified by a user who provided the comment. In other examples, the comments may fly from left to right on the screen, may fly between lines of the news, or may be displayed in a split window on the right or left of the window showing the news. In some example, the comments may be shown in a transparent or semi-transparent mode such that the user can still see the text of the news under the comments. In some example, different comments may be displayed in different manners. At the stage 140, the user has scrolled up the news a little bit to see more texts about the news, and hence more comments related to some portions of the news.

Figure 1E:
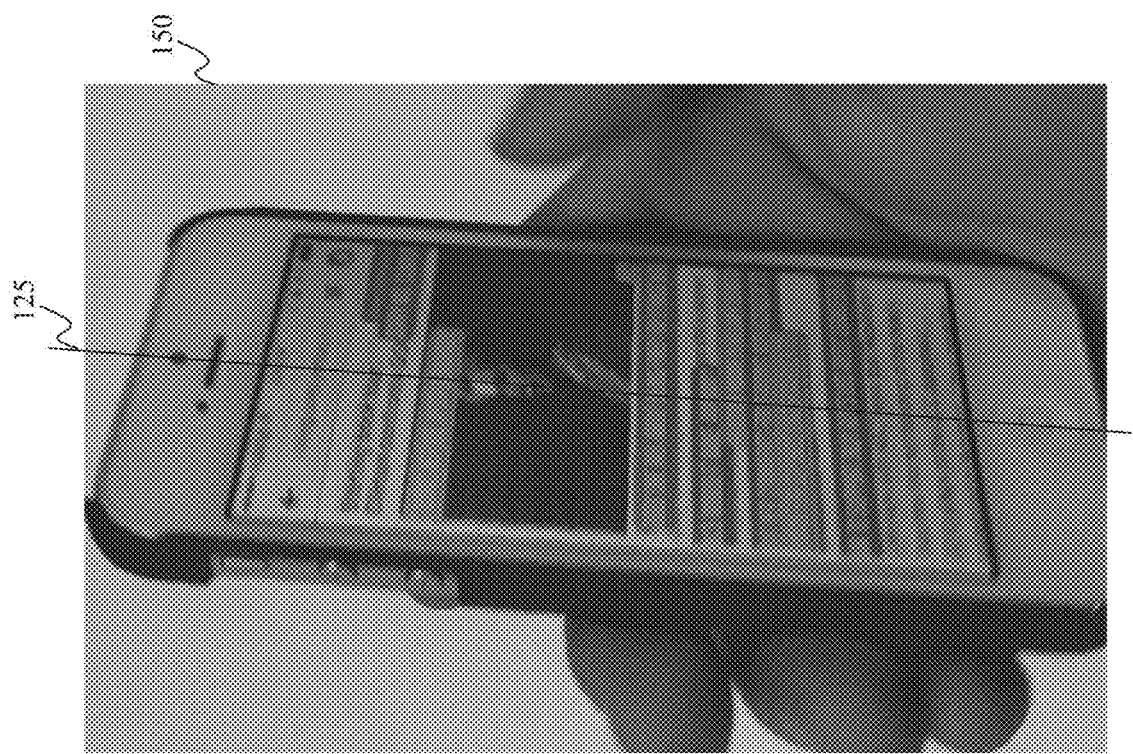

At shown in FIG. 1E, the user turns the left side of the smartphone to the right, e.g. by rolling the smartphone about the longitudinal axis 125 to the right, at the stage 150. This action may turn off the presentation of comments from other users. If the user was hearing voices generated by reading the comments, the action may also turn off the voices. In addition, the action may cause the news to be closed from the screen. At this stage 150, the user may have finished reading the news or want to stop reading the news.

Figure 1F:
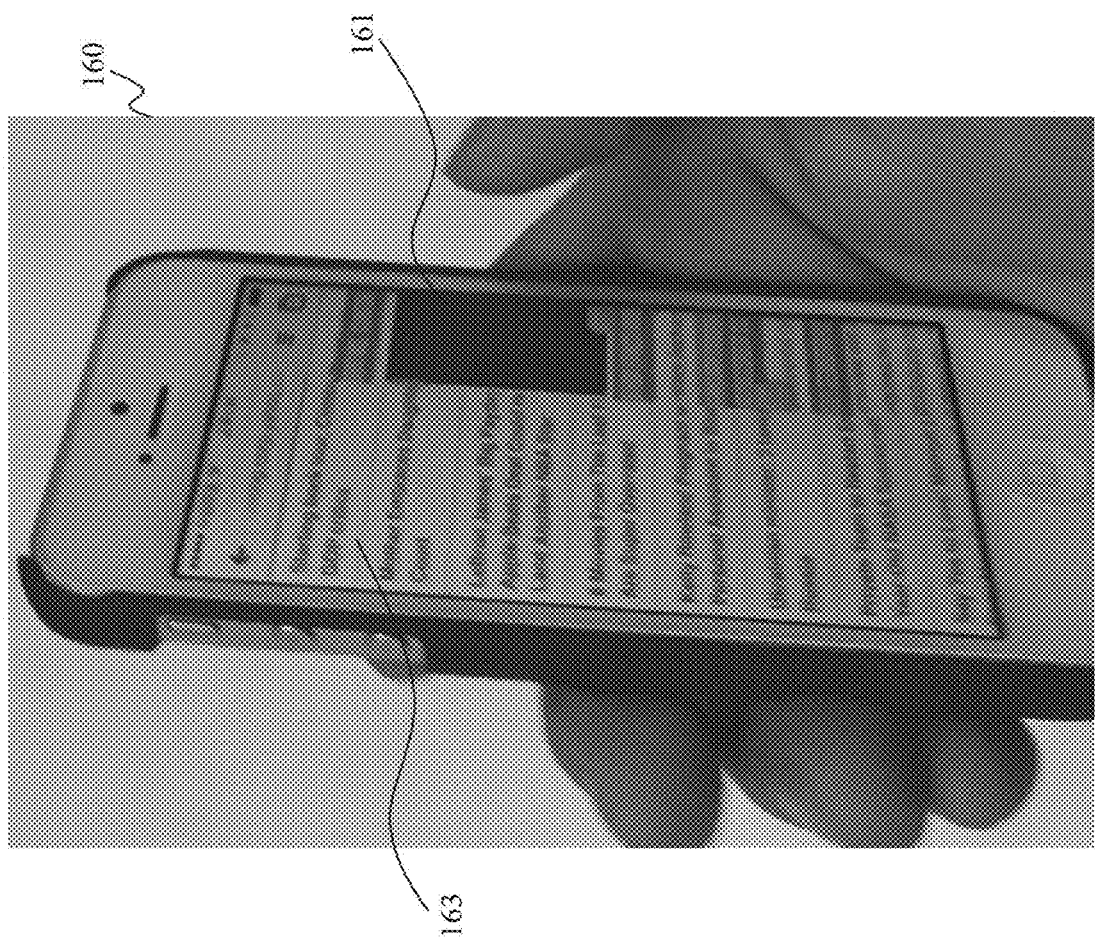

As shown in FIG. 1F, after the user rolls the smartphone from left to right, the news 161 is closed, by moving out of the screen from left to right. At this stage 160, a web page 163 starts being shown on the screen. The web page 163 may be a web page from where the user was directed to the news 161.

Figure 2A:
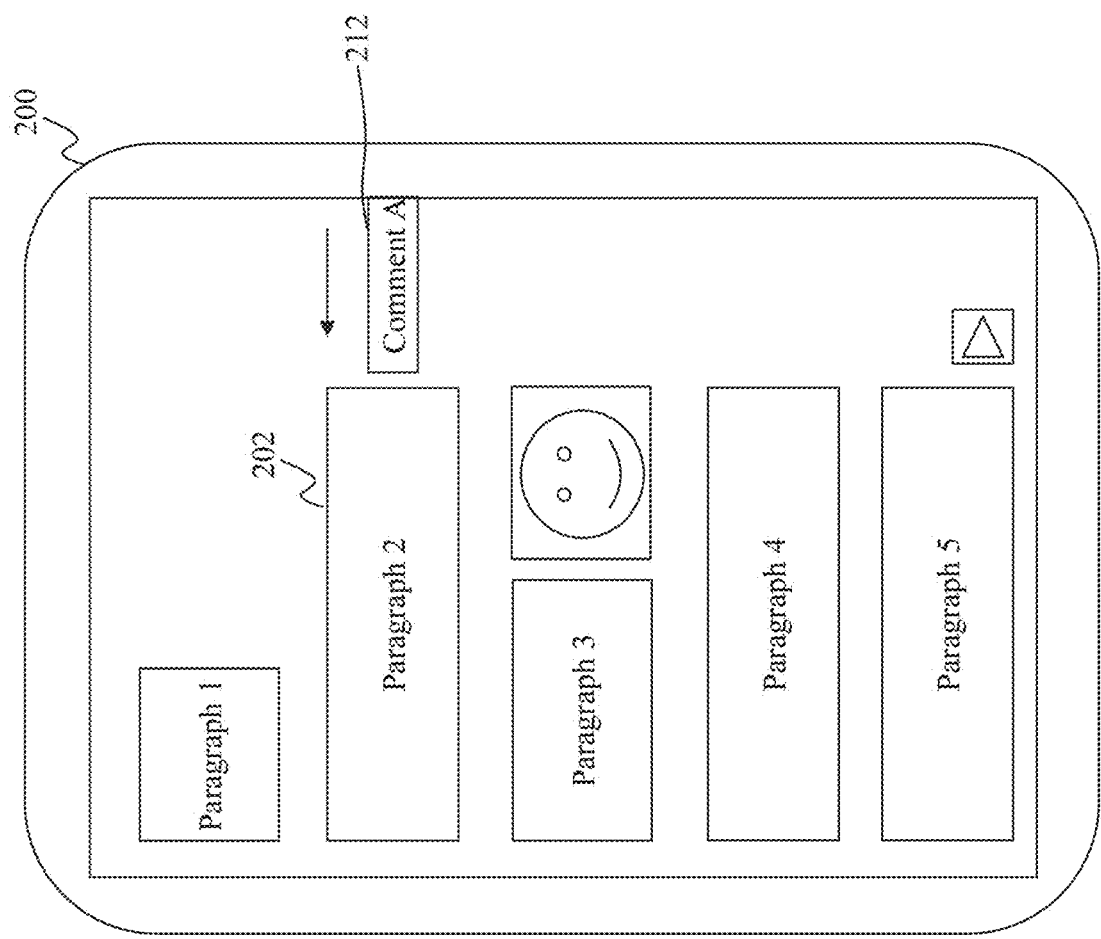
FIGS. 2A-2H illustrate a user interface on a screen where interaction driven electronic social experience is provided, according to various embodiments of the present teaching.

FIGS. 2A-2H illustrate a user interface on a screen where interaction driven electronic social experience is provided, according to various embodiments of the present teaching. As shown in FIG. 2A, a document is displayed on a screen 200 of a device. The document in this example includes multiple paragraphs that may include text, image, audio, and/or video information. After interaction driven electronic social experience is activated, comments start to be shown on the screen 200. The interaction driven electronic social experience may be activated by rolling the device from one side to another, clicking on an icon, moving the device away or closer to the user, shaking the device, rotating the device, and/or saying a voice command by the user. Each comment shown on the screen 200 may be related to a portion of the document. For example, Comment A 212 is related to Paragraph 2 202. Accordingly, Comment A 212 is flying over Paragraph 2 202, from right to left.

Figure 2B:
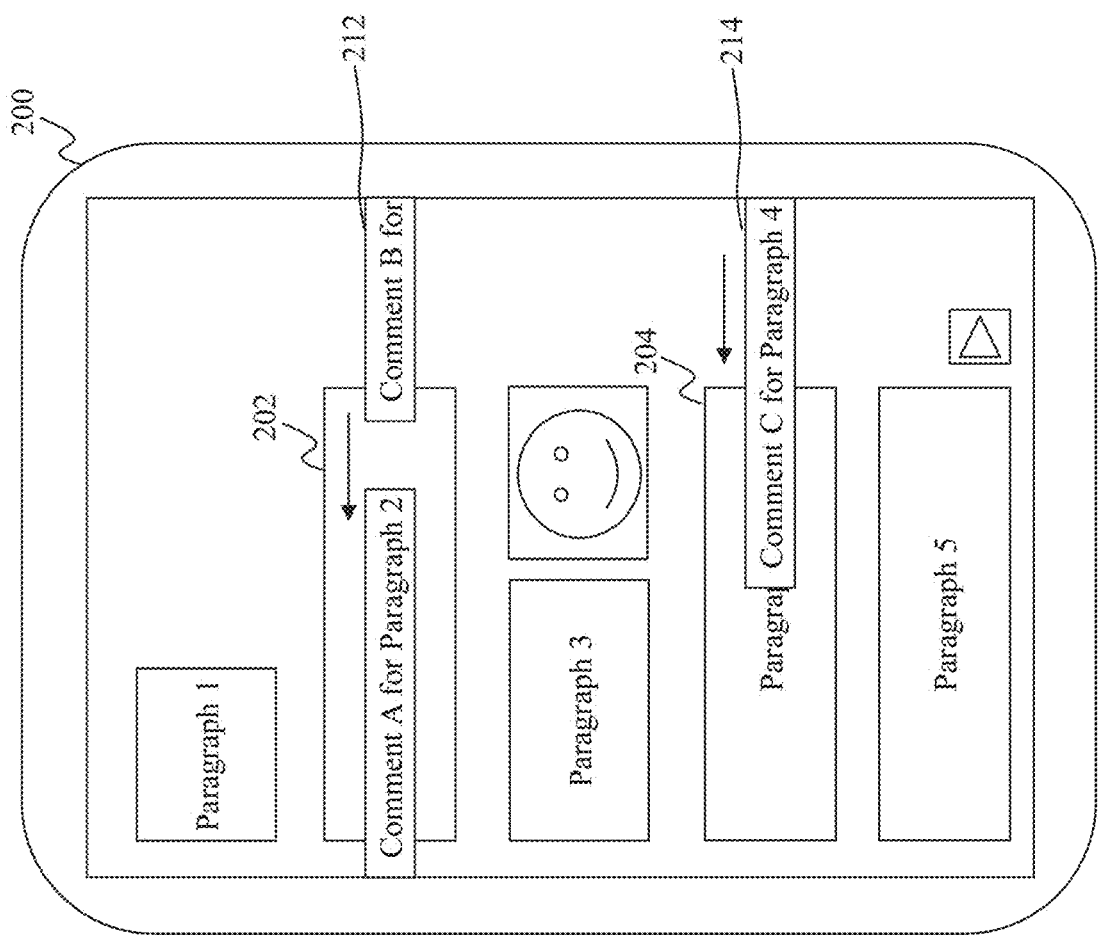

In FIG. 2B, more comments are shown on the screen 200. For example, since comments A and B are both related to Paragraph 2 202, they are flying over Paragraph 2 202 one after another. In one embodiment, when multiple comments are related to a same portion of a document, they may fly in parallel over the portion at the same time. In FIG. 2B, comment C 214 is related to Paragraph 4 204, and hence flying over Paragraph 4 204 from right to left.

Figure 2C:
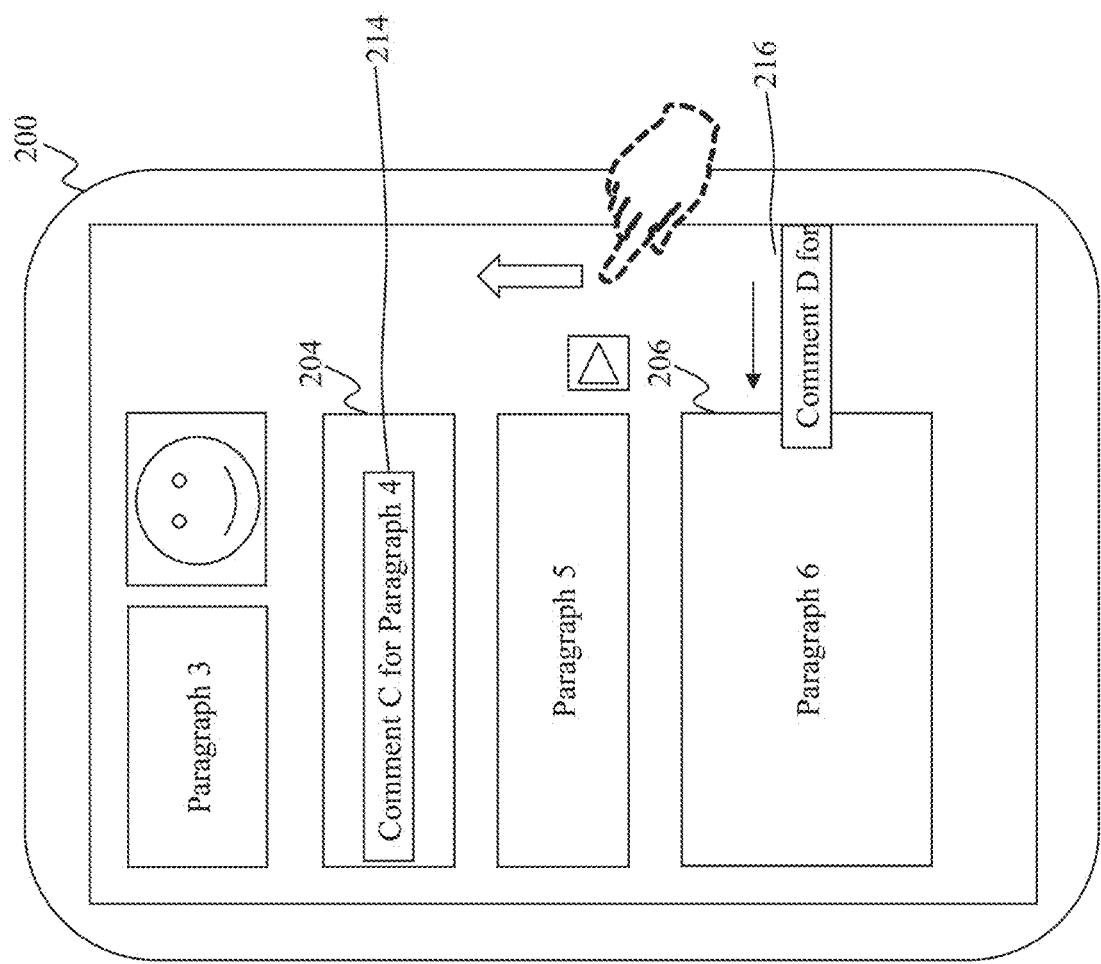

In FIG. 2C, a user scrolls up the document so that paragraphs 1 and 2 moves out of the screen 200, while Paragraph 6 206 appears in the screen 200. Accordingly, Comment D 216 that is related to Paragraph 6 206 starts flying over Paragraph 6 206 from right to left on the screen 200.

Figure 2D:
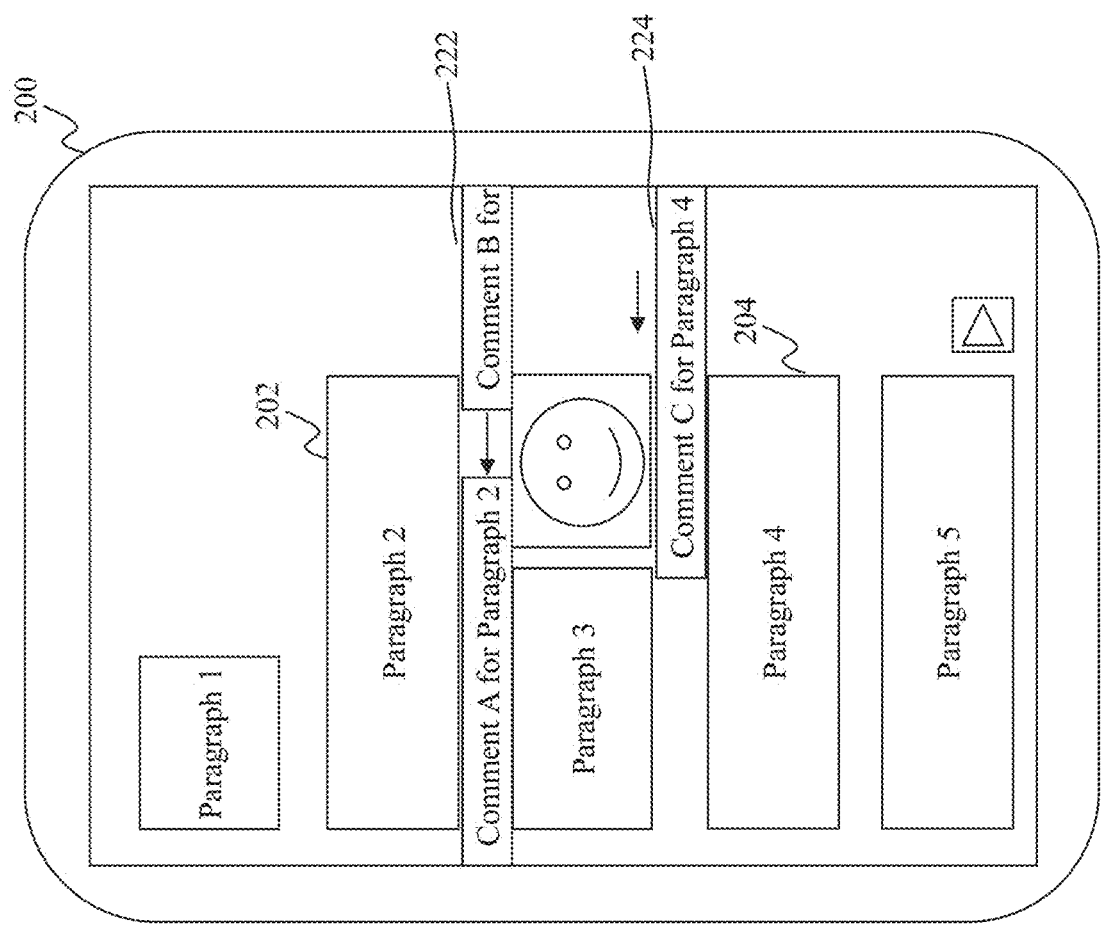

FIG. 2D illustrates a user interface on the screen 200 where interaction driven electronic social experience is provided, according to an embodiment of the present teaching. In this embodiment, a comment related to a paragraph is flying between paragraphs. For example, comments A and B 222 are related to Paragraph 2 202 and flying between paragraphs 2 and 3; Comment C 224 is related to Paragraph 4 204 and flying between paragraphs 3 and 4. In other embodiments, the comments may fly from left to right, or in other directions.

Figure 2E:
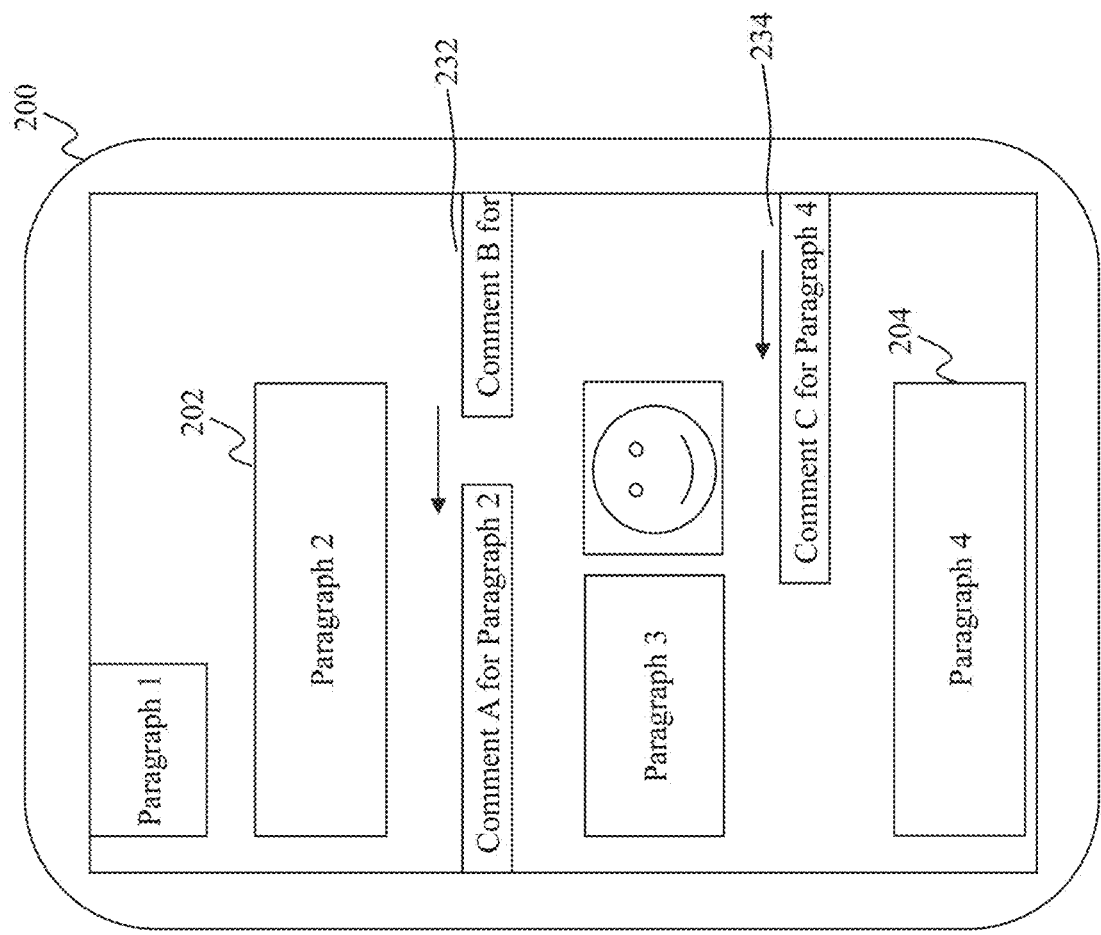

FIG. 2E illustrates a user interface on the screen 200 where interaction driven electronic social experience is provided, according to an embodiment of the present teaching. In this embodiment, when a comment related to a paragraph starts flying into the screen 200, the paragraph is separated with neighbor paragraphs with larger space. Accordingly, the comments may fly in the larger space between paragraphs. For example, comments A and B 222 are related to Paragraph 2 202 and flying in an enlarged space between paragraphs 2 and 3; Comment C 224 is related to Paragraph 4 204 and flying in an enlarged space between paragraphs 3 and 4. In one example, after comments related to a paragraph fly out of the screen 200, the enlarged space will shrink to its original size. In other embodiments, a comment may be related to a sentence in a paragraph, and hence can fly between the sentences in the paragraph.

Figure 2F:
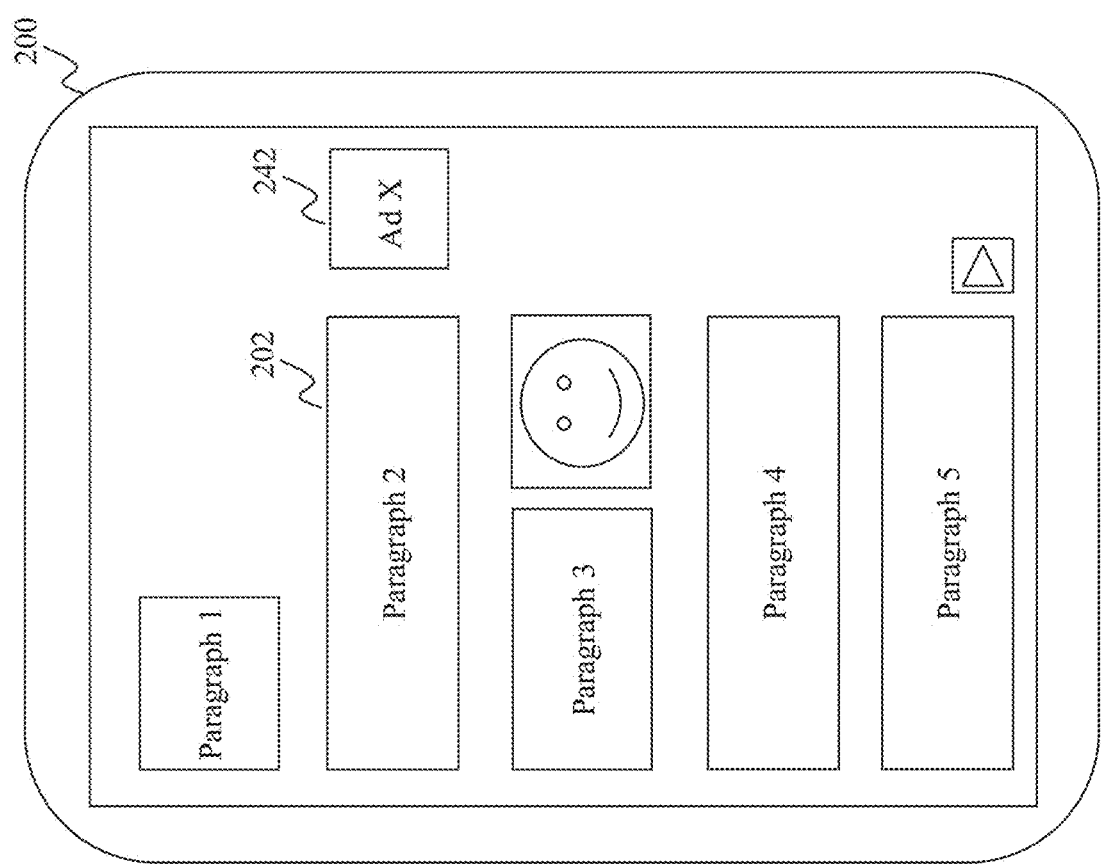
Figure 2G:
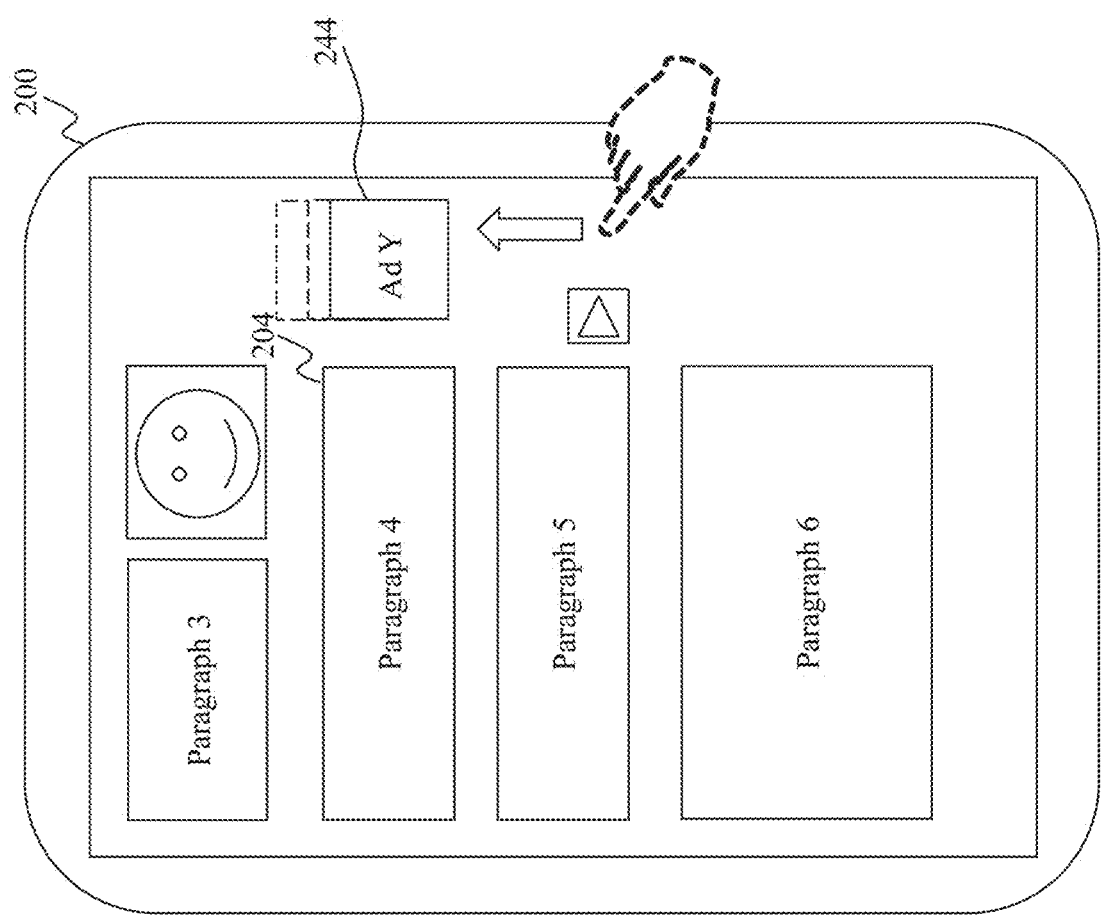

FIG. 2F and FIG. 2G illustrate a user interface on the screen 200 where interaction driven electronic social experience is provided, according to an embodiment of the present teaching. In this embodiment, an advertisement X 242 related to Paragraph 2 202 is shown beside the Paragraph 2 202. The advertisement X 242 may come from the publisher providing the document, or from a third party advertiser. The advertisement X 242 may include content related to text in the Paragraph 2 202. For example, if the Paragraph 2 202 includes text describing sport games, the advertisement X 242 may be related to sport utility products.

In FIG. 2G, a user scrolls up the document so that paragraphs 1 and 2 moves out of the screen 200, while Paragraph 6 206 appears in the screen 200. Accordingly, the advertisement X related to Paragraph 2 also moves out of the screen 200; while the advertisement Y 244 related to Paragraph 4 204 starts to be shown beside the Paragraph 4 204. As shown in FIG. 2G, while the user moves up or down the document, the advertisement Y 244 moves along with the Paragraph 4 204, such that they are always shown close to each other.

In other embodiments, the advertisement Y 244 may be shown below, above, or on other sides of Paragraph 4 204. An advertisement shown in FIG. 2F and/or FIG. 2G may include text, image, audio, and/or video.

Figure 2H:
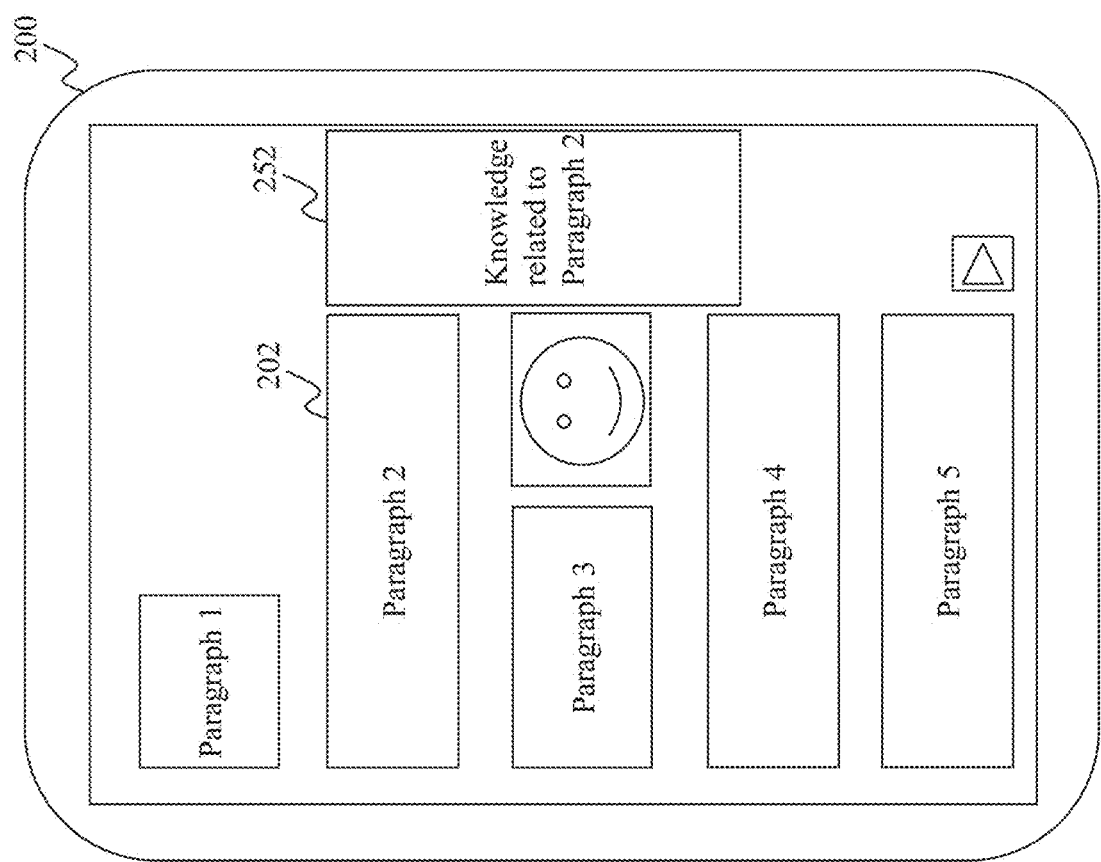

FIG. 2H illustrates a user interface on the screen 200 where interaction driven electronic social experience is provided, according to an embodiment of the present teaching. In this embodiment, some knowledge 252 related to Paragraph 2 202 is shown beside the Paragraph 2 202. The knowledge 252 may come from a knowledge database or a knowledge related website, e.g. www.wikipedia.com. The knowledge 252 may include information related to text in the Paragraph 2 202, so that a user reading Paragraph 2 202 can better understand a corresponding background, or some related news or documents.

Figure 3:
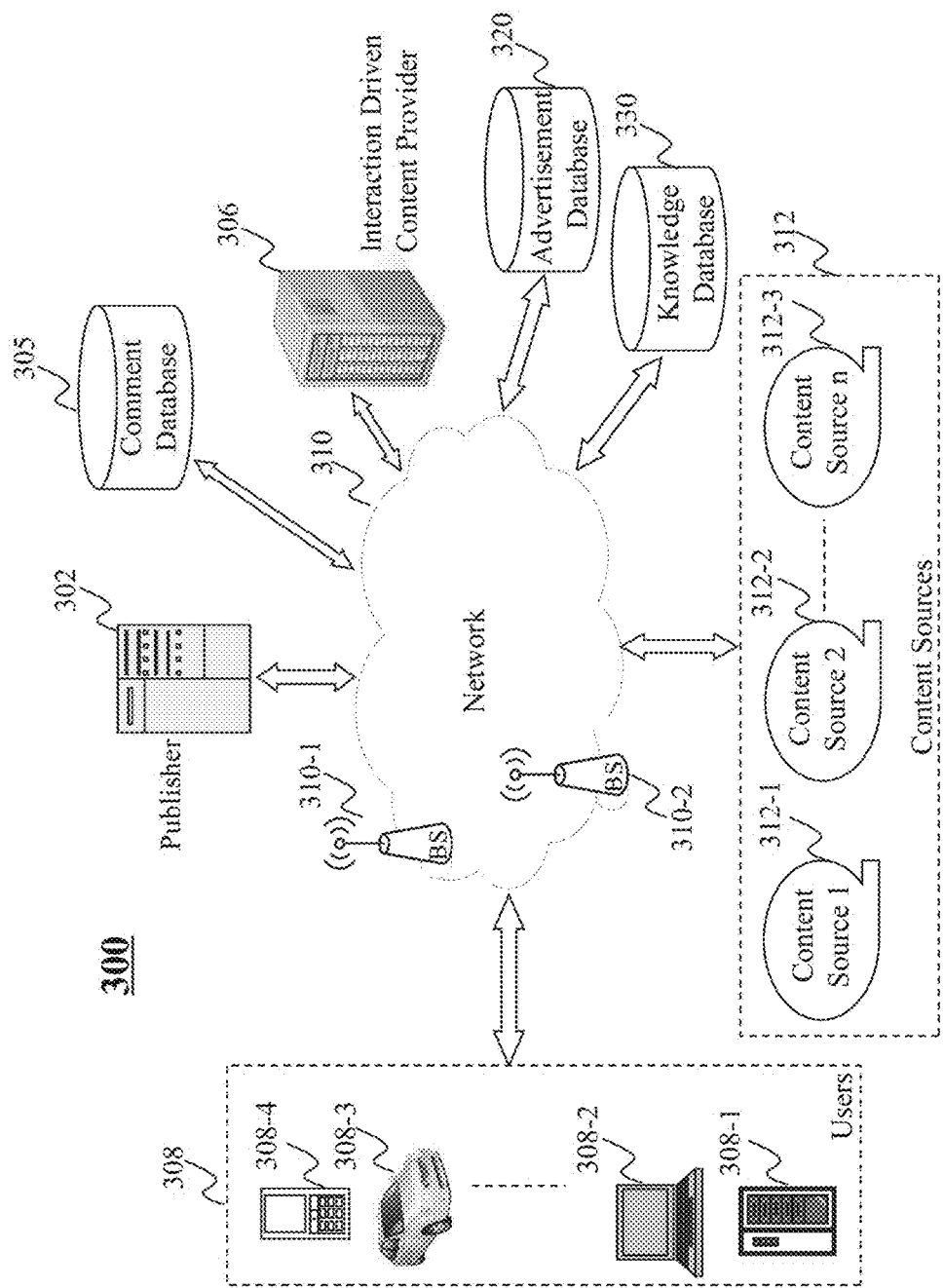
FIG. 3 is a high level depiction of an exemplary networked environment for providing interaction driven electronic social experience, according to an embodiment of the present teaching.

FIG. 3 is a high level depiction of an exemplary networked environment 300 for providing interaction driven electronic social experience, according to an embodiment of the present teaching. In FIG. 3, the exemplary networked environment 300 includes a publisher 302, a comment database 305, an interaction driven content provider 306, an advertisement database 320, and a knowledge database 330, one or more users 308, a network 310, and content sources 312. The network 310 may be a single network or a combination of different networks. For example, the network 310 may be a local area network (LAN), a wide area network (WAN), a public network, a private network, a proprietary network, a Public Telephone Switched Network (PSTN), the Internet, a wireless network, a virtual network, or any combination thereof. In an example of Internet advertising, the network 310 may be an online advertising network or ad network that is a company connecting advertisers to web sites that want to host advertisements. A key function of an ad network is aggregation of ad space supply from publishers and matching it with advertiser demand. The network 310 may also include various network access points, e.g., wired or wireless access points such as base stations or Internet exchange points 310-1 . . . 310-2, through which a data source may connect to the network 310 in order to transmit information via the network 310.

Users 308 may be of different types such as users connected to the network 310 via desktop computers 308-1, laptop computers 308-2, a built-in device in a motor vehicle 308-3, or a mobile device 308-4. A user 308 may send a request to the publisher 302 via the network 310 and receive content from the publisher 302. The content may be a web page, a document, news, a movie, music, etc.

The interaction driven content provider 306 may access comments stored in the comment database 305 and provide comments related to a content item that the user 308 is accessing. The comment may be provided with respect to a portion of the content item, e.g. flying over or shown beside the portion. The interaction driven content provider 306 may also access and provide other content items related to the content item that the user 308 is accessing. The other content items may include advertisements in the advertisement database 320 and/or knowledge in the knowledge database 330. The interaction driven content provider 306 may provide an instruction to the publisher 302 to indicate how to present the content items related to the content item that the user 308 is accessing. In one embodiment, the user 308 may have control of when and whether to view the related content items generated by the interaction driven content provider 306.

The content sources 312 include multiple content sources 312-1, 312-2 . . . 312-3, such as vertical content sources. A content source 312 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The publisher 302 and the interaction driven content provider 306 may access information from any of the content sources 312-1, 312-2 . . . 312-3.

Figure 4:
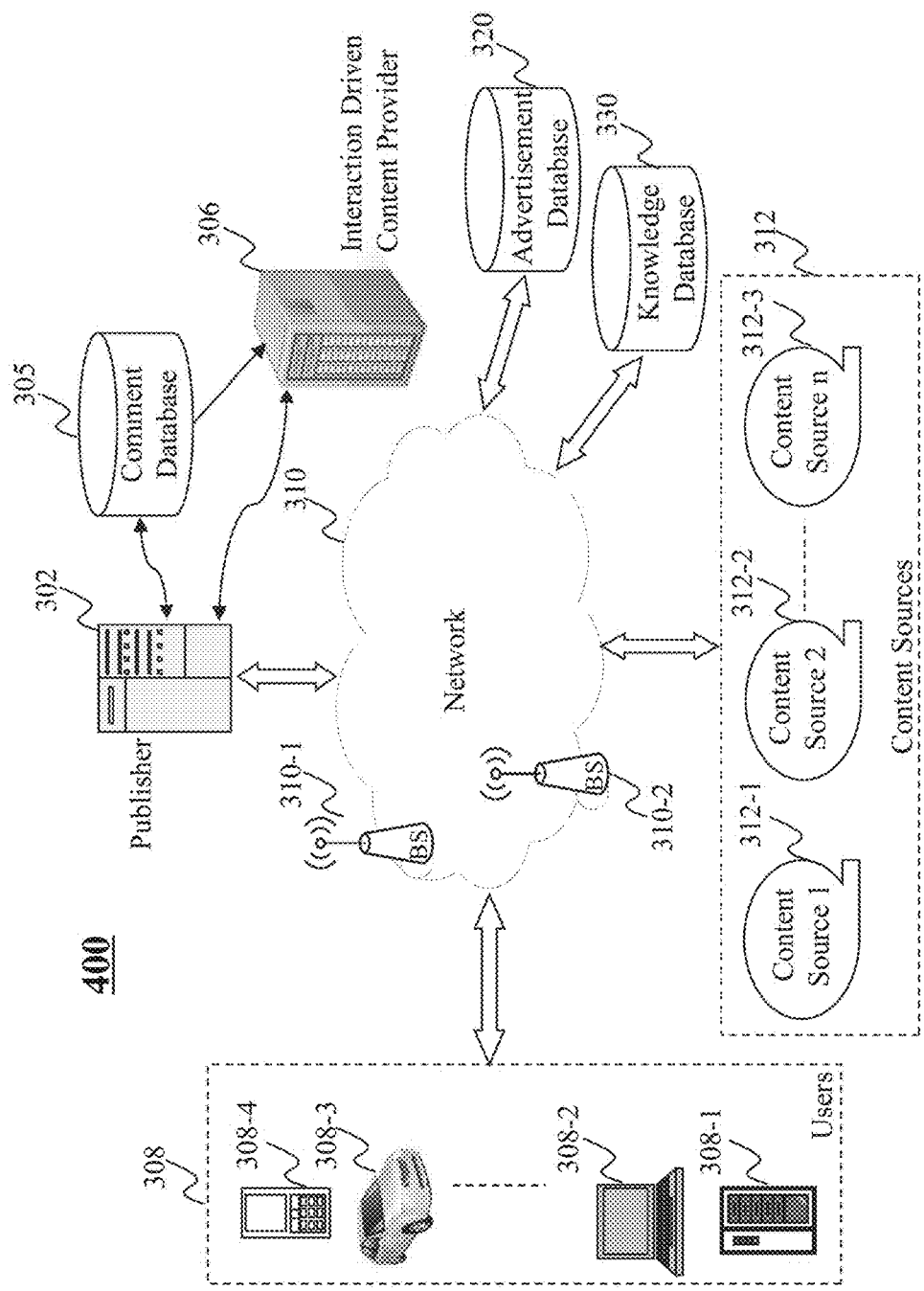
FIG. 4 is a high level depiction of another exemplary networked environment for providing interaction driven electronic social experience, according to an embodiment of the present teaching.

FIG. 4 is a high level depiction of another exemplary networked environment 400 for providing interaction driven electronic social experience, according to an embodiment of the present teaching. The exemplary networked environment 400 in this embodiment is similar to the exemplary networked environment 300 in FIG. 3, except that the interaction driven content provider 306 serves as a backend system of the publisher 302.

Figure 5:
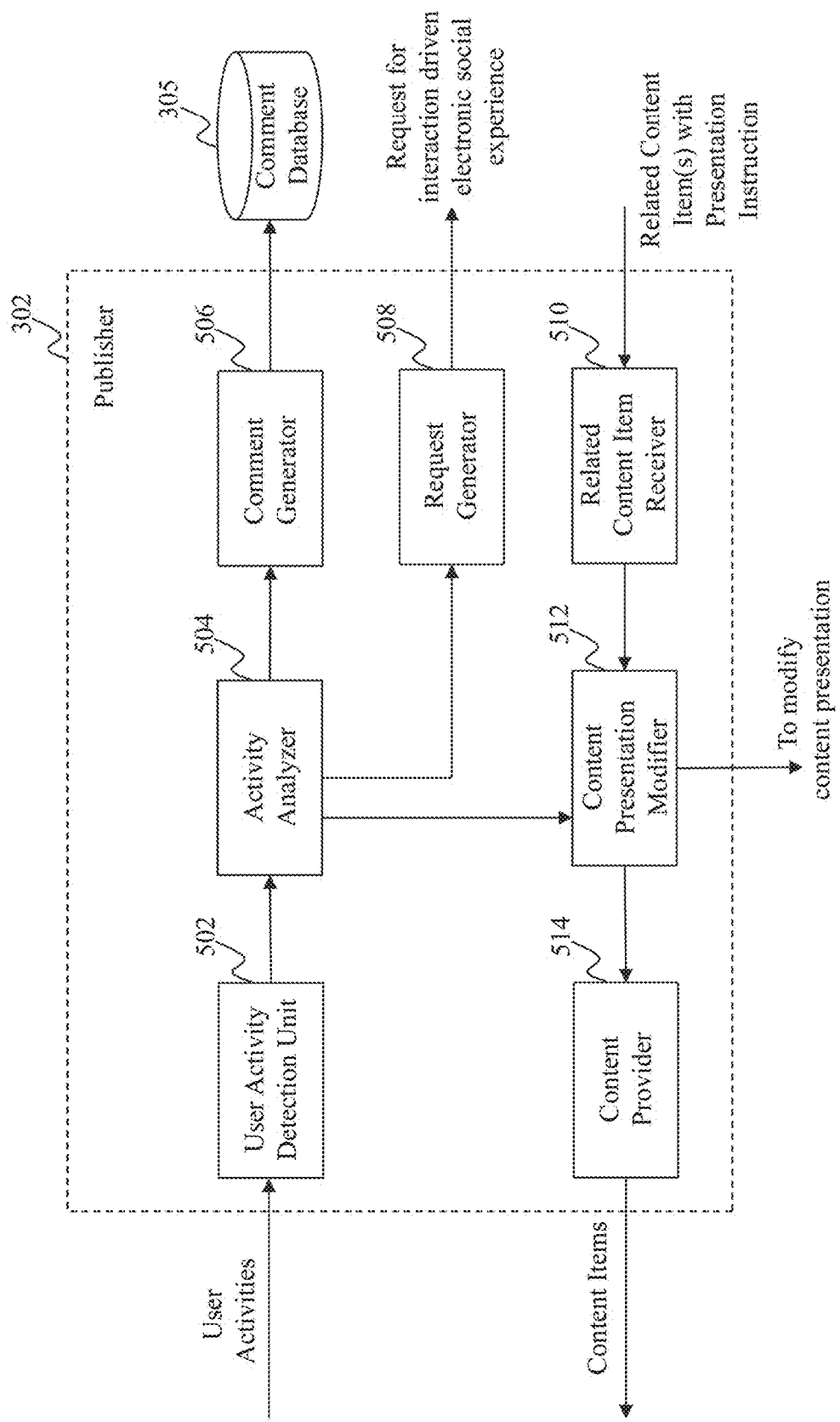
FIG. 5 illustrates an exemplary diagram of a publisher, according to an embodiment of the present teaching.

FIG. 5 illustrates an exemplary diagram of the publisher 302, according to an embodiment of the present teaching. The publisher 302 in this example includes a user activity detection unit 502, an activity analyzer 504, a comment generator 506, a request generator 508, a related content item receiver 510, a content presentation modifier 512, and a content provider 514.

The user activity detection unit 502 in this example can monitor and detect user activities from different users. An action or activity from a user may include pressing, swiping, clicking, typing, rotating, zooming, scrolling, shaking, etc. Another example of action from a user is dwelling for a dwell time within which the user does not provide any input. In addition to traditional user activities like mouse clicking or keyboard typing related to links or documents provided to a user, more user activities related to manipulation of a user device can be detected by the user activity detection unit 502. In one example, the user activity detection unit 502 may detect whether the user is rolling the device from left to right or from right to left, e.g. about a longitudinal axis of the device. In another example, the user activity detection unit 502 may detect whether the user is moving the device away from the user or closer to the user. In yet another example, the user activity detection unit 502 may detect whether the user is rotating or shaking the device.

An action or activity received at the user activity detection unit 502 may indicate a request or an interest from the user. The activity analyzer 504 in this example may analyze the user activities detected by the user activity detection unit 502 to determine what is the user's request or interest. For example, a user may be accessing a document provided by the content provider 514. The user activity detection unit 502 can detect an action from the user with respect to the document. The activity analyzer 504 may analyze the action to determine the user's desire.

In one embodiment, the action is rolling the device from right to left, as shown in FIG. 1B. In that case, the activity analyzer 504 may determine the user wants to activate comments shown on the screen, based on configuration of the system. Then the activity analyzer 504 can inform the request generator 508 for generating a request for interaction driven electronic social experience for the user.

In another embodiment, the action is clicking on an icon "Read Comments", as shown in FIG. 1C. In that case, the activity analyzer 504 may determine the user wants to hear voices generated by reading comments related to the document, based on configuration of the system. Then the activity analyzer 504 can inform the request generator 508 for generating a request for interaction driven electronic social experience for the user, including a request for text-to-speech conversion.

In yet another embodiment, the action is rolling the device from left to right, as shown in FIG. 1E. In that case, the activity analyzer 504 may determine the user wants to deactivate or turn off comments shown on the screen, based on configuration of the system. Then the activity analyzer 504 can inform the content presentation modifier 512 for modifying presentation of content provided to the user.

In still another embodiment, the action is clicking on an icon "Enter Comments", not shown before. In that case, the activity analyzer 504 may determine the user wants to input some comment related to the document, based on configuration of the system. Then the activity analyzer 504 can inform the comment generator 506 for generating a comment for the user and saving the comment into the comment database 305 for future interaction social experience related to the document. In one example, the user may also identify a portion related to the comment he/she enters, e.g. by clicking on a sentence or paragraph to indicate relationship with his/her comments.

A desire from the user for interaction driven electronic social experience may be detected based on an action like: rolling the device, moving the device away or closer to the user, shaking the device, etc. Once the desire is detected by the activity analyzer 504, the request generator 508 may generate and send a request for interaction driven electronic social experience, e.g. to the interaction driven content provider 306. In response, the interaction driven content provider 306 may generate related content items with a presentation instruction. The related content items may include comments, advertisement, and/or knowledge, each of which being related to a portion of the document that the user is accessing. For example, comment A is related to the second paragraph; comment B is related to the fourth paragraph; advertisement B is related to first sentence of the third paragraph, etc. The presentation instruction may include information about how to present the related content items. For example, comment A is to be presented over the second paragraph; comment B is to be presented below the fourth paragraph; advertisement B is to be presented beside the first sentence of the third paragraph, etc.

The related content item receiver 510 in this example may receive the related content items with the presentation instruction, e.g. from the interaction driven content provider 306. The related content item receiver 510 may send the related content items with the presentation instruction to the content presentation modifier 512 for modifying content presentation to the user. For example, based on the presentation instruction, the content presentation modifier 512 may send information to the user's device to enlarge space between two paragraphs of the document, such that comments related to the two paragraphs may be presented in the enlarged space. In one example, based on an action from the user, the content presentation modifier 512 may split the screen of the device into two windows, up and down, left and right, or in other manners, such that the document is presented in one window while the related content items may be presented in the other window.

When the content presentation modifier 512 determines that related content items need to be presented, the content presentation modifier 512 may forward the information to the content provider 514. The content provider 514 in this example may provide the related content items to the user, together with the presentation instruction that can be implemented by the device. The content provider 514 in this example may also provide the original document to the user. In other words, the document that the user is accessing may be provided by the content provider 514.

A desire from the user for generating a comment may be detected by an action like: clicking on an icon, clicking on a portion of the document, typing in some words, etc. Once the desire is detected by the activity analyzer 504, the comment generator 506 may generate and save a comment into the comment database 305. The generated comment may be displayed on the screen of the user or not. The generated comment may be displayed on the screen of other users who are accessing the document. In one embodiment, the generated comment may be displayed on the screen of the user's friends who are accessing the document. The generated comment may be related to another comment from another user. In addition, other users may enter comments with respect to the generated comment later. As such, interaction driven electronic social experience is provided to the user and other users.

Figure 6:
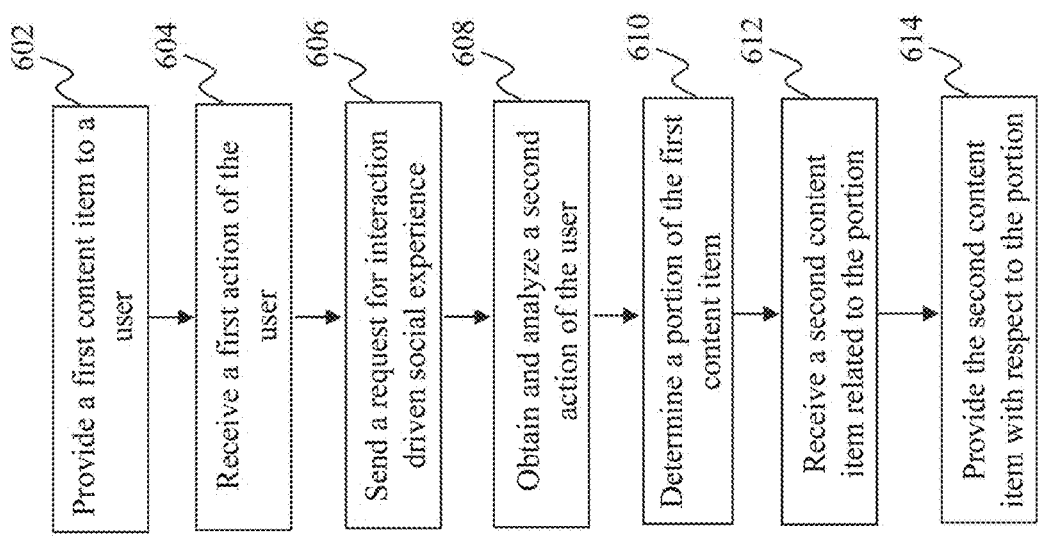
FIG. 6 is a flowchart of an exemplary process performed by a publisher, according to an embodiment of the present teaching.

FIG. 6 is a flowchart of an exemplary process performed by the publisher 302, according to an embodiment of the present teaching. At 602, a first content item is provided to a user. At 604, a first action of the user is received. At 606, a request for interaction driven social experience is sent. At 608, a second action of the user is obtained and analyzed. At 610, a portion of the first content item is determined to be interesting to the user. At 612, a second content item related to the portion is received. At 614, the second content item is provided with respect to the portion, e.g. close to the portion, over the portion, beside the portion, etc.

Figure 7:
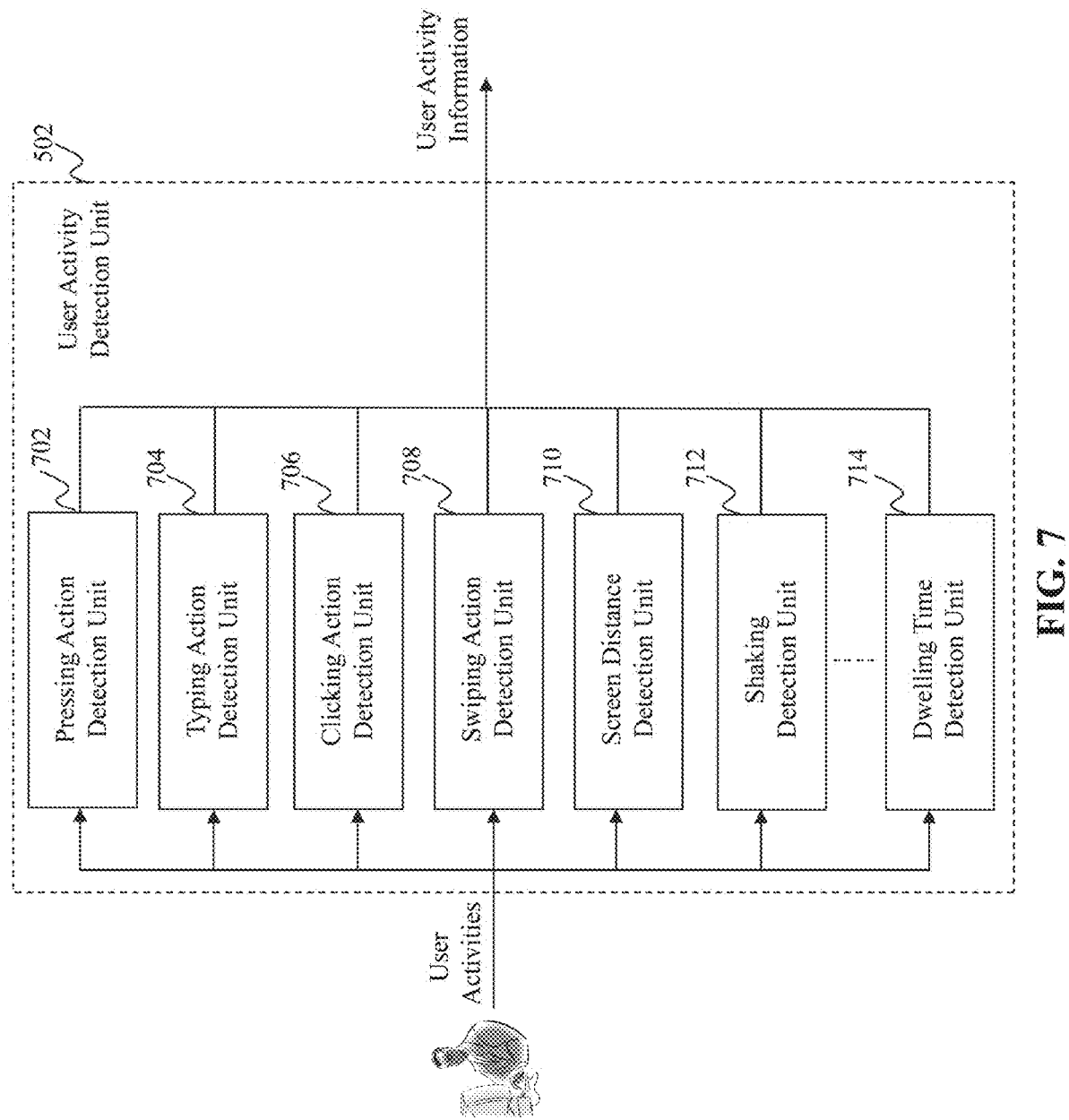
FIG. 7 illustrates an exemplary diagram of a user activity detection unit, according to an embodiment of the present teaching.

FIG. 7 illustrates an exemplary diagram of the user activity detection unit 502, according to an embodiment of the present teaching. The user activity detection unit 502 in this example includes a pressing action detection unit 702, a typing action detection unit 704, a clicking action detection unit 706, a swiping action detection unit 708, a screen distance detection unit 710, a shaking detection unit 712, and a dwelling time detection unit 714.

The pressing action detection unit 702 may be configured for detecting a pressing action performed by a user on a touchscreen. For example, a pressing action can be detected when the user presses down on the touchscreen for a period of time longer than a predetermined threshold before the user releases the pressure. The typing action detection unit 704 may be configured for detecting a typing action performed by a user on a keyboard, which may be a physical keyboard connected to the device or a soft keyboard on a touchscreen. The clicking action detection unit 706 may be configured for detecting a clicking action performed by a user on a touchscreen, or by a computer mouse. For example, a clicking action can be detected when the user presses down on the touchscreen for a period of time shorter than a predetermined threshold before the user releases the pressure. The swiping action detection unit 708 may be configured for detecting a swiping action performed by a user on a touchscreen. For example, a swiping action can be detected when the user presses down with a finger on the touchscreen and moves the finger on the surface of the touchscreen.

The screen distance detection unit 710 may be configured for detecting a distance between the screen and the user. The shaking detection unit 712 may be configured for detecting a shaking action performed by a user with respect to the device. The dwell time detection unit 714 may be configured for detecting a dwell time of the user when none of the other detection units in the user activity detection unit 502 detects any input from the user for a period of time.

It can be understood that more units related to user actions can be included in the user activity detection unit 502, e.g., units for detecting actions of zooming, scrolling, rolling, turning, etc.

Figure 8:
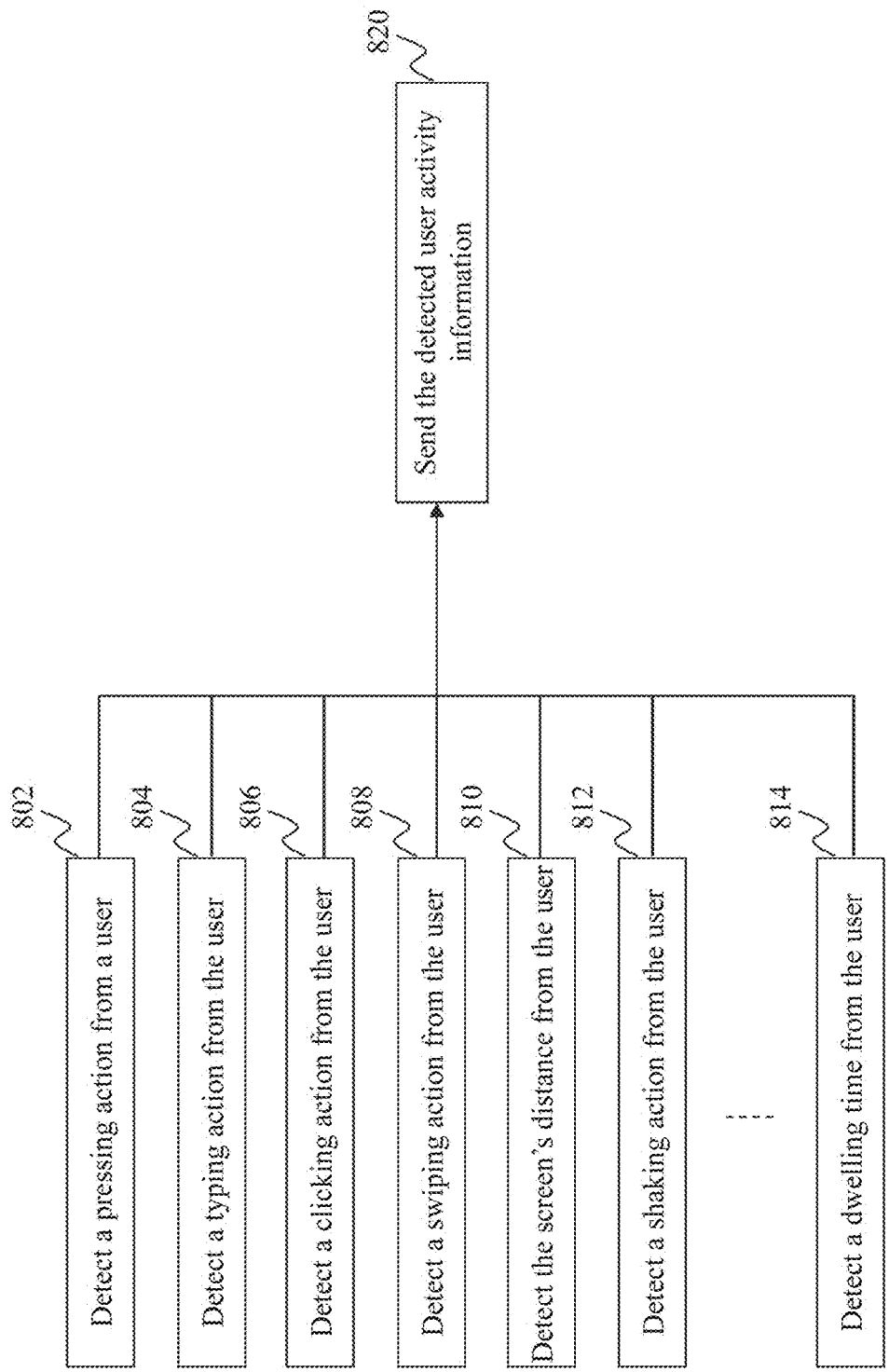
FIG. 8 is a flowchart of an exemplary process performed by a user activity detection unit, according to an embodiment of the present teaching.

FIG. 8 is a flowchart of an exemplary process performed by the user activity detection unit 502, according to an embodiment of the present teaching. At 802, a pressing action is detected from a user. At 804, a typing action is detected from the user. At 806, a clicking action is detected from the user. At 808, a swiping action is detected from the user. At 810, the screen's distance from the user is detected. At 812, a shaking action is detected from the user. At 814, a dwell time is detected from the user.

It can be understood that in an embodiment, only one or more of the steps of 802-814 may be performed. In can also be understood that the steps of 802-814 may be performed either in parallel as shown in FIG. 8 or in serial. After each of the steps of 802-814, the process may go to 820, where the detected user activity information is sent.

Figure 9:
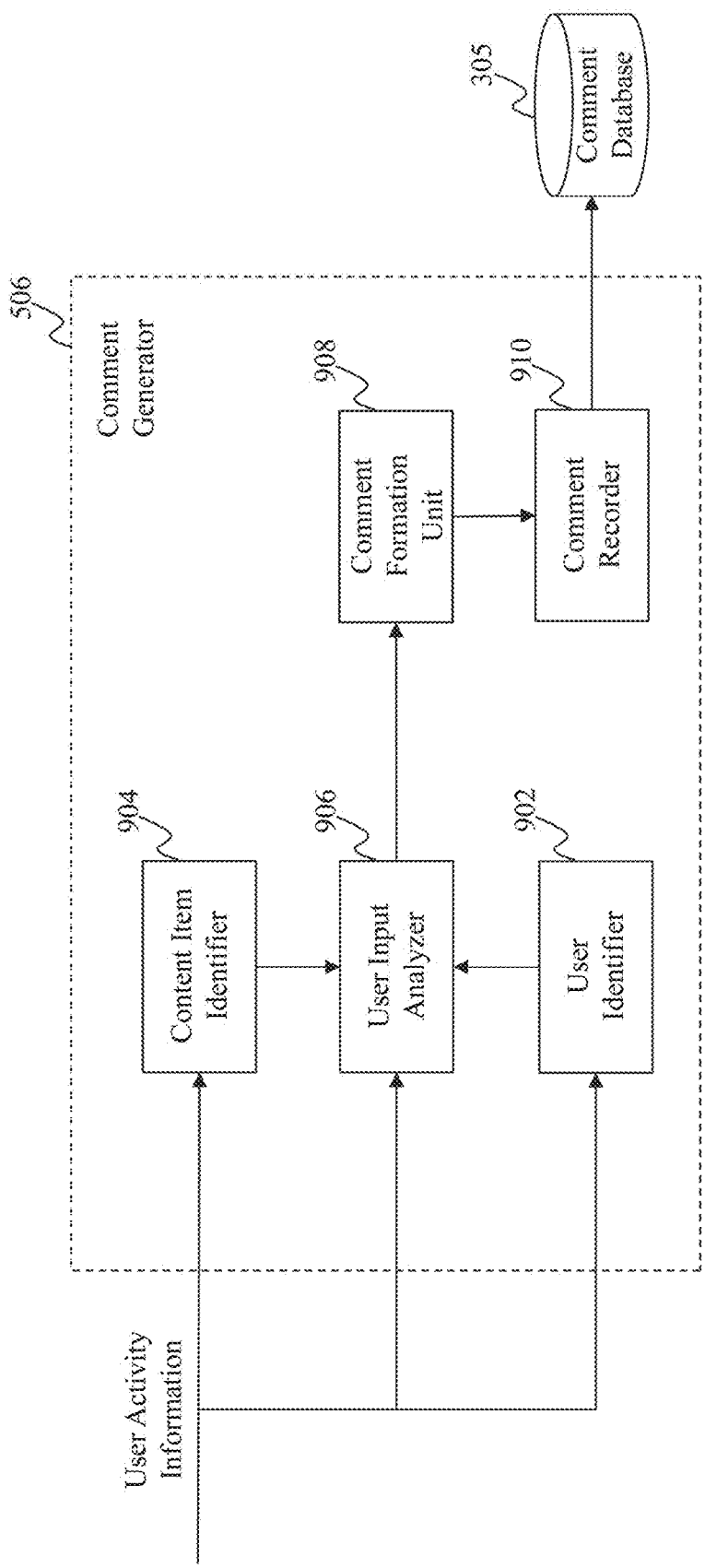
FIG. 9 illustrates an exemplary diagram of a comment generator, according to an embodiment of the present teaching.

FIG. 9 illustrates an exemplary diagram of the comment generator 506, according to an embodiment of the present teaching. The comment generator 506 in this example includes a user identifier 902, a content item identifier 904, a user input analyzer 906, a comment formation unit 908, and a comment recorder 910. The user activity information analyzed by the activity analyzer 504 may indicate a desire from the user to enter a comment. In this example, the user identifier 902 receives user activity information and identifies the user based on the user activity information. The content item identifier 904 may receive user activity information and determine the content item that the user is accessing.

The user input analyzer 906 in this example may determine a user input from the user activity information. The user input may include text entered by the user for commenting, and/or may indicate a portion in the content item related to the text. The user input analyzer 906 may analyze the user input and associate the user's identity from the user identifier 902 with the text entered by the user. The user input analyzer 906 may also determine the portion related to the text, and associate the portion with the content item determined by the content item identifier 904. The portion may be determined based on an explicit input from the user, e.g. when the user clicks on the portion to indicate it is related to his/her comment. The portion may also be determined based on an implicit input from the user, e.g. when the user is inputting his/her comment, the portion is presented in a center portion of the screen of the user's device. The portion may also be determined based on an analysis of the user input, e.g. a topic of the text entered by the user may be related to the portion. The user input analyzer 906 can then send information about the text, the portion, the user, and/or the content item to the comment formation unit 908 for generating a comment.

The comment formation unit 908 in this example may receive the above information from the user input analyzer 906 and generate a comment for the user. The comment may have associated information including but not limited to information about the user and information about the related portion in the content item. In one example, the content item is a document, and the related portion is the second paragraph of the document. In another example, the content item is a movie the user is viewing, and the related portion is a part, section, clip, or segment of the movie.

In one embodiment, instead of being related to a portion of the content item, the comment may be related to a comment from another user on the content item. In another embodiment, instead of generating a comment, the comment formation unit 908 may generate an advertisement or some knowledge, based on the input from the user. In that case, the user may be a representative of an advertiser or an expert in the area related to the content item.

The comment recorder 910 in this example saves the comment and its associated information into the comment database 305 for future use. For example, the system may retrieve the comment in the future when another user accesses the content item and is provided interaction driven social experience. In one embodiment, the system can provide the comment from the user immediately after it is generated, such that the user can see his or her own comment being presented in association with the portion. This enables a real-time social experience for the users.

Figure 10:
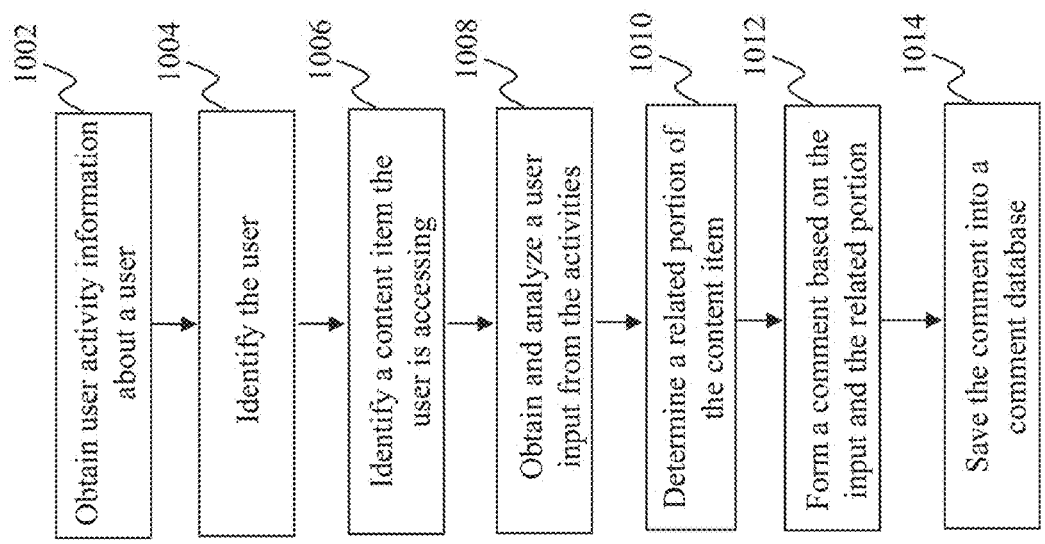
FIG. 10 is a flowchart of an exemplary process performed by a comment generator, according to an embodiment of the present teaching.

FIG. 10 is a flowchart of an exemplary process performed by the comment generator 506, according to an embodiment of the present teaching. At 1002, user activity information about a user is obtained. At 1004, the user is identified, e.g. based on the user activity information. At 1006, a content item that the user is accessing is identified, e.g. based on the user activity information. At 1008, a user input is obtained and analyzed based on the user activity information.

At 1010, a portion of the content item that is related to the user input is determined. For example, the user input indicates a comment from the user on a sentence or paragraph of a document that the user is reading. At 1012, a comment is formed based on the input and the related portion. In other embodiments, an advertisement or a piece of knowledge may be formed based on the input and the related portion. At 1014, the comment or other formed content items are saved into a database, e.g. the comment database 305.

Figure 11:
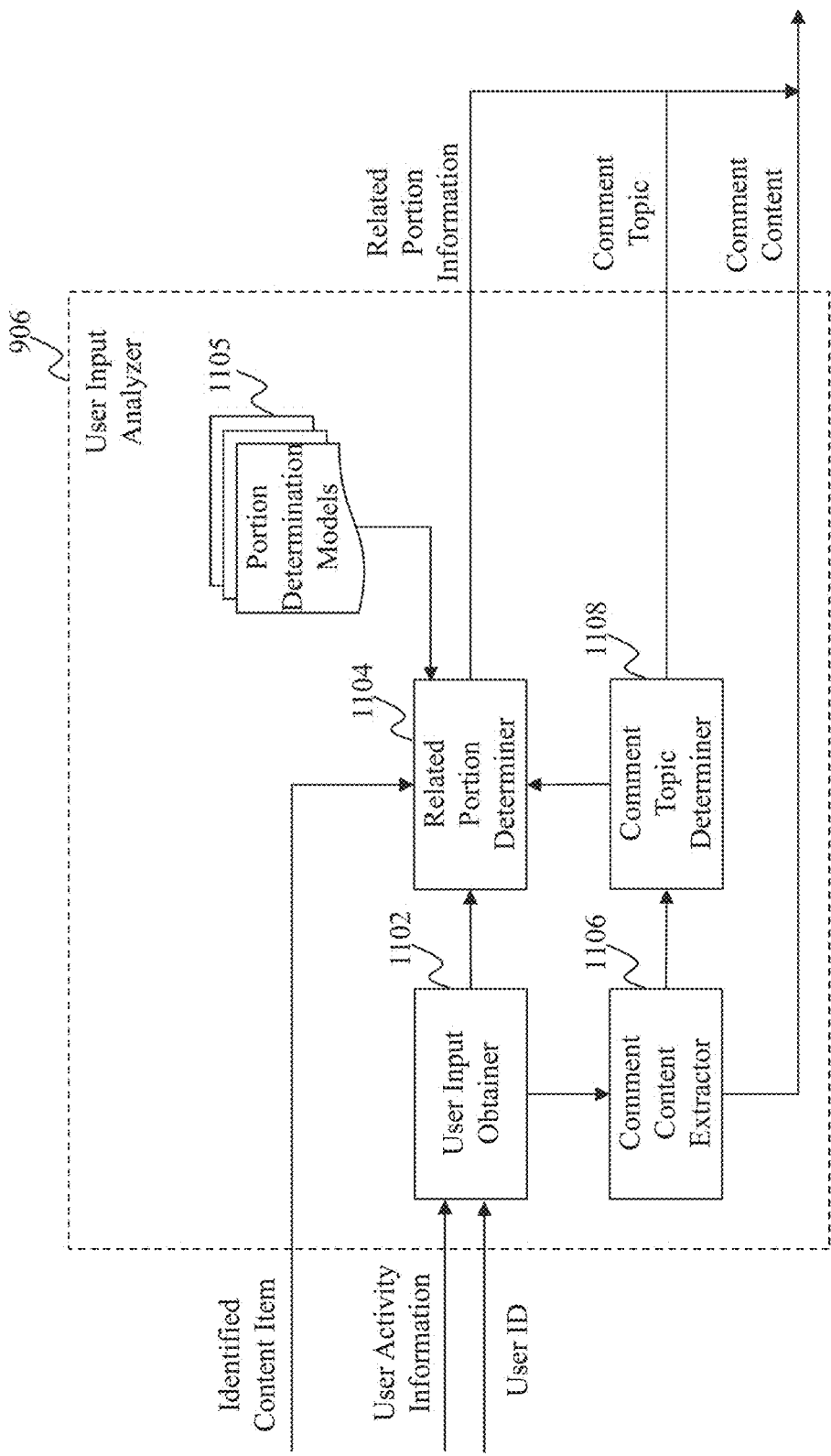
FIG. 11 illustrates an exemplary diagram of a user input analyzer, according to an embodiment of the present teaching.

FIG. 11 illustrates an exemplary diagram of the user input analyzer 906, according to an embodiment of the present teaching. The user input analyzer 906 in this example includes a user input obtainer 1102, a related portion determiner 1104, one or more portion determination models 1105, a comment content extractor 1106, and a comment topic determiner 1108.

The user input obtainer 1102 in this example receives a user ID identified by the user identifier 902 and user activity information from the activity analyzer 504. The user input obtainer 1102 may determine a user input from the user activity information. For example, the user input obtainer 1102 may determine the user clicks on some portion of the paragraph and/or input some texts e.g. by typing on a keyboard. The user input obtainer 1102 may send the user input to the related portion determiner 1104 and the comment content extractor 1106.

The related portion determiner 1104 may identify a portion in the content item that the user is accessing. The content item may be identified by the content item identifier 904 and sent to the related portion determiner 1104. The related portion determiner 1104 may select a portion determination model 1105 and identify the portion based on the portion determination model 1105. In accordance with one portion determination model, the related portion determiner 1104 may identify the portion based on an input from the user. For example, the user clicks on a sentence to indicate his/her comment is related to the sentence. In accordance with another portion determination model, the related portion determiner 1104 may identify the portion based on analysis of the user's comment. For example, a semantic analysis of the content item and the user's comment at the related portion determiner 1104 may indicate that the comment is related to a paragraph of the content item, although the user did not explicitly indicate the paragraph. In this case, the related portion determiner 1104 may need information from the comment content extractor 1106 and the comment topic determiner 1108.

The comment content extractor 1106 in this example receives user input obtained by the user input obtainer 1102 and extracts comment content from the user input. The comment content extractor 1106 may then send the extracted comment content to the comment topic determiner 1108. The comment topic determiner 1108 in this example determines a topic for the extracted comment. For example, the topic may be sport, weather, travel, movie, etc. In one embodiment, the comment topic determiner 1108 may determine multiple topics for a comment and rank them according to their relevance to the comment. The comment topic determiner 1108 may then send the determined topic to the related portion determiner 1104, especially when a portion determination model indicates to determine the related portion based on a topic of the comment.

In various embodiments, the user input analyzed by the user input analyzer 906 may include an advertisement and/or knowledge background related to the content item. The user input may be in form of text, audio, video, image, etc.

Figure 12:
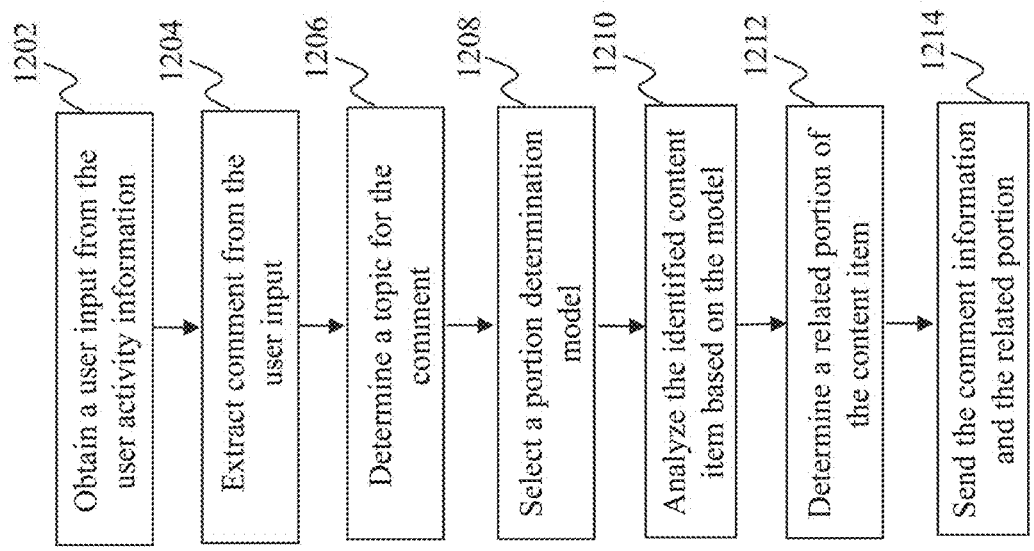
FIG. 12 is a flowchart of an exemplary process performed by a user input analyzer, according to an embodiment of the present teaching.

FIG. 12 is a flowchart of an exemplary process performed by the user input analyzer 906, according to an embodiment of the present teaching. At 1202, a user input is obtained from the user activity information. At 1204, a comment is extracted from the user input. At 1206, a topic is determined for the comment. At 1208, a portion determination model is selected. At 1210, the identified content item is analyzed based on the model. At 1212, a related portion of the content item is determined. At 1214, the comment information and the related portion are sent.

Figure 13:
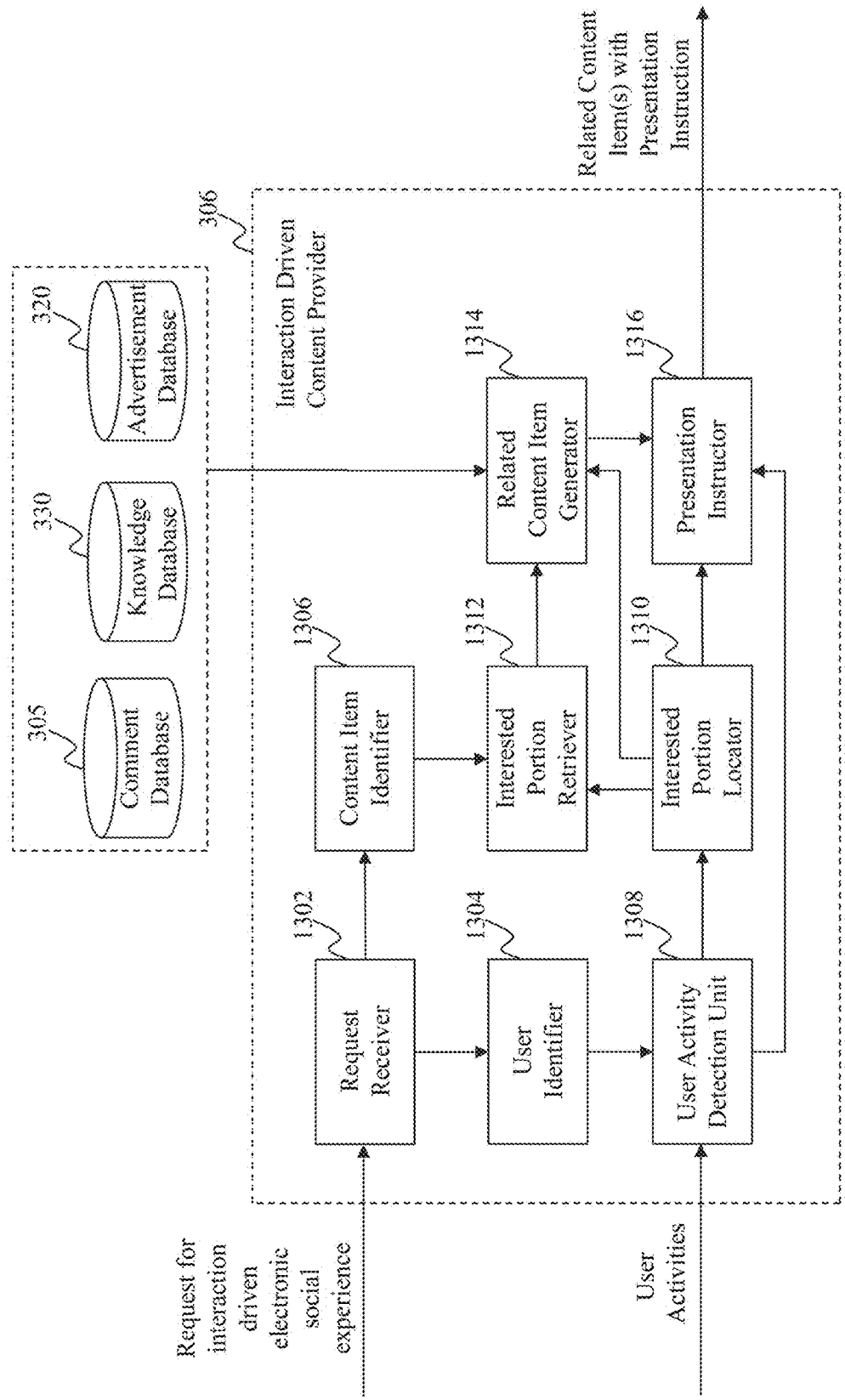
FIG. 13 illustrates an exemplary diagram of an interaction driven content provider, according to an embodiment of the present teaching.

FIG. 13 illustrates an exemplary diagram of an interaction driven content provider, e.g. the interaction driven content provider 306 in FIG. 3 or FIG. 4, according to an embodiment of the present teaching. The interaction driven content provider 306 in this example includes a request receiver 1302, a user identifier 1304, a content item identifier 1306, an optional user activity detection unit 1308, an interested portion locator 1310, an interested portion retriever 1312, a related content item generator 1314, and a presentation instructor 1316.

The request receiver 1302 in this example receives a request for providing interaction driven electronic social experience to a user. The request may come from the publisher 302 that is providing a content item to the user. The user identifier 1304 in this example may determine the user's identity based on the request. The content item identifier 1306 in this example may identify the content item that the user is accessing. In one embodiment, the user's identity and the content item identity are sent by the publisher 302 together with the request.

The user activity detection unit 1308 in this example detects user activities from the user. As discussed above, the user activities may include pressing, swiping, clicking, typing, rotating, zooming, scrolling, shaking, dwelling, etc. In one embodiment, the user activities can be detected by the publisher 302 and sent to the interaction driven content provider 306, such that there is no need for the interaction driven content provider 306 to include the user activity detection unit 1308.

Based on the detected activities, the interested portion locator 1310 may locate a portion that is interesting to the user. For example, the interested portion locator 1310 may locate a paragraph of a document that the user is reading, if the user zooms in to see the paragraph, or if the paragraph is in the center portion of the document for a long dwell time of the user. In one embodiment, the interested portion locator 1310 may locate all content, including text, image, audio, and/or video, being presented on the screen of the user's device. After locating a portion, the interested portion locator 1310 may send the location information to the interested portion retriever 1312 for retrieving the portion. The interested portion retriever 1312 in this example may receive information about the content item from the content item identifier 1306 and location of the portion from the interested portion locator 1310. Accordingly, the interested portion retriever 1312 may retrieve or extract the portion from the content item and send it to the related content item generator 1314.

The related content item generator 1314 in this example can analyze the portion that the user is interested in. Based on the analysis, the related content item generator 1314 may generate another content item related to the portion. For example, the related content item generator 1314 may retrieve information from the comment database 305, the knowledge database 330, and/or the advertisement database 320. The retrieved information is related to the portion, in terms of either the location of the portion or the content of the portion. For example, the related content item generator 1314 may retrieve a comment previously entered by another user associated with the portion. For example, the related content item generator 1314 may retrieve an advertisement from the knowledge database 330 based on a similarity between the advertisement and a topic of the portion. The related content item generator 1314 can generate additional content items based on the retrieved information. Because the additional content items are determined to be related to the portion interesting to the user, it is likely that the user will be interested in the additional content items as well. In one embodiment where the interested portion locator 1310 locates multiple interesting portions, the related content item generator 1314 may generate one or more related content items for each of the interesting portions.

The presentation instructor 1316 in this example receives the generated content items from the related content item generator 1314 and creates an instruction regarding presentation of the generated content items. The presentation instructor 1316 may generate the presentation instruction based on e.g. the user activity information from the user activity detection unit 1308, the location of the interesting portion from the interested portion locator 1310, the related content items generated by the related content item generator 1314, and/or information about the user's demographics, device, etc.

In one example, based on the user activity information, the presentation instructor 1316 may determine the user's intent is to see the related items in a separate layer. The separate layer may be on top of the layer including the content item that the user is accessing. The separate layer may also be in a separate window from the window including the content item that the user is accessing. In one embodiment, the system may provide the user two layers, a real layer and a virtual layer. If the user wants to see the correlative comments, he/she can switch between the two layers by changing the distance between mobile screen and his/her eyes. For example, when the user moves mobile screen closer, the virtual layer emerges; when the user moves it away, the real layer emerges. The transition between the two layers can be shaded. The comments may be in either the real layer or the virtual layer.

In another example, based on the location of an interesting portion, the presentation instructor 1316 may determine the related content items to be presented close to the location. For example, if the location of the interesting portion is at the top of the screen, the presentation instructor 1316 may determine the related content items to be presented below the interesting portion. For example, if the location of the interesting portion is at the bottom of the screen, the presentation instructor 1316 may determine the related content items to be presented above the interesting portion.

In yet another example, the presentation instructor 1316 may determine a presentation instruction based on characteristics of the related content items. For example, the presentation instructor 1316 may determine that a related text comment is to be presented by flying over the interesting portion and a related video clip is to be presented beside the interesting portion. Audio generated by reading the text comment and/or audio from the video clip may be presented as well.

In still another example, the presentation instructor 1316 may determine a presentation instruction based on the user's information. For example, the presentation instructor 1316 may determine a related comment to be presented over the portion of the content item, if the user's device is a handheld device like a smartphone. For example, the presentation instructor 1316 may determine a related comment to be presented in a window below, above, or beside the window including the portion of the content item, if the user's device is a personal computer, a laptop, or a tablet. In general, the presentation instructor 1316 may determine a presentation instruction based on the screen size of the user's device.

In addition, the presentation instructor 1316 may determine a presentation instruction based on the user's demographic information. For example, if historical data analysis shows that older people tend to prefer a split window with large font size, the presentation instructor 1316 may determine a related comment to be shown in a split window with large font size if the user is older than a predetermined threshold.

The presentation instructor 1316 may send related content item(s) with the presentation instruction to the publisher 302 for providing the user interaction driven electronic social experience.

Figure 14:
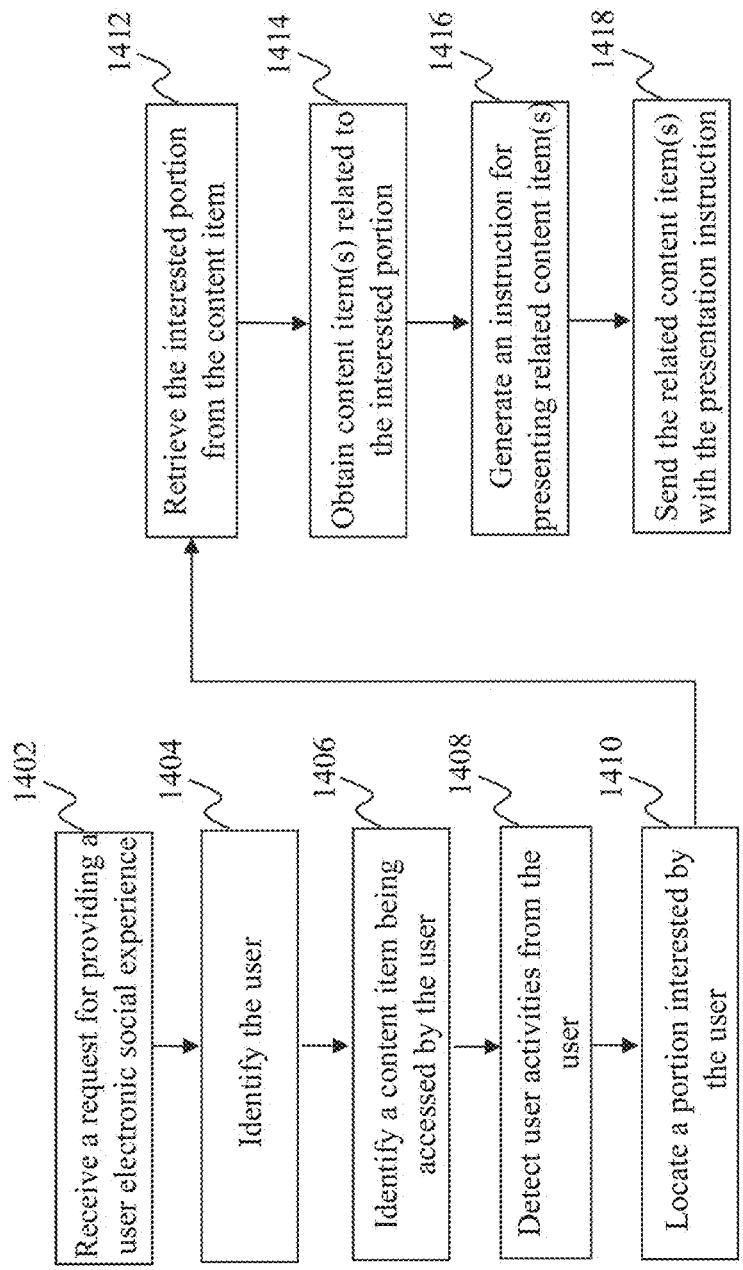
FIG. 14 is a flowchart of an exemplary process performed by an interaction driven content provider, according to an embodiment of the present teaching.

FIG. 14 is a flowchart of an exemplary process performed by the interaction driven content provider 306, according to an embodiment of the present teaching.

At 1402, a request is received for providing interaction driven electronic social experience to a user. At 1404, the user is identified. At 1406, a content item being accessed by the user is identified. At 1408, user activities are detected from the user.

At 1410, a portion of the content item is located based on interests of the user. At 1412, the interested is retrieved from the content item. At 1414, the content item(s) related to the interested portion are obtained. At 1416, an instruction is generated for presenting the related content item(s). At 1418, the related content item(s) are sent with the presentation instruction.

Figure 15:
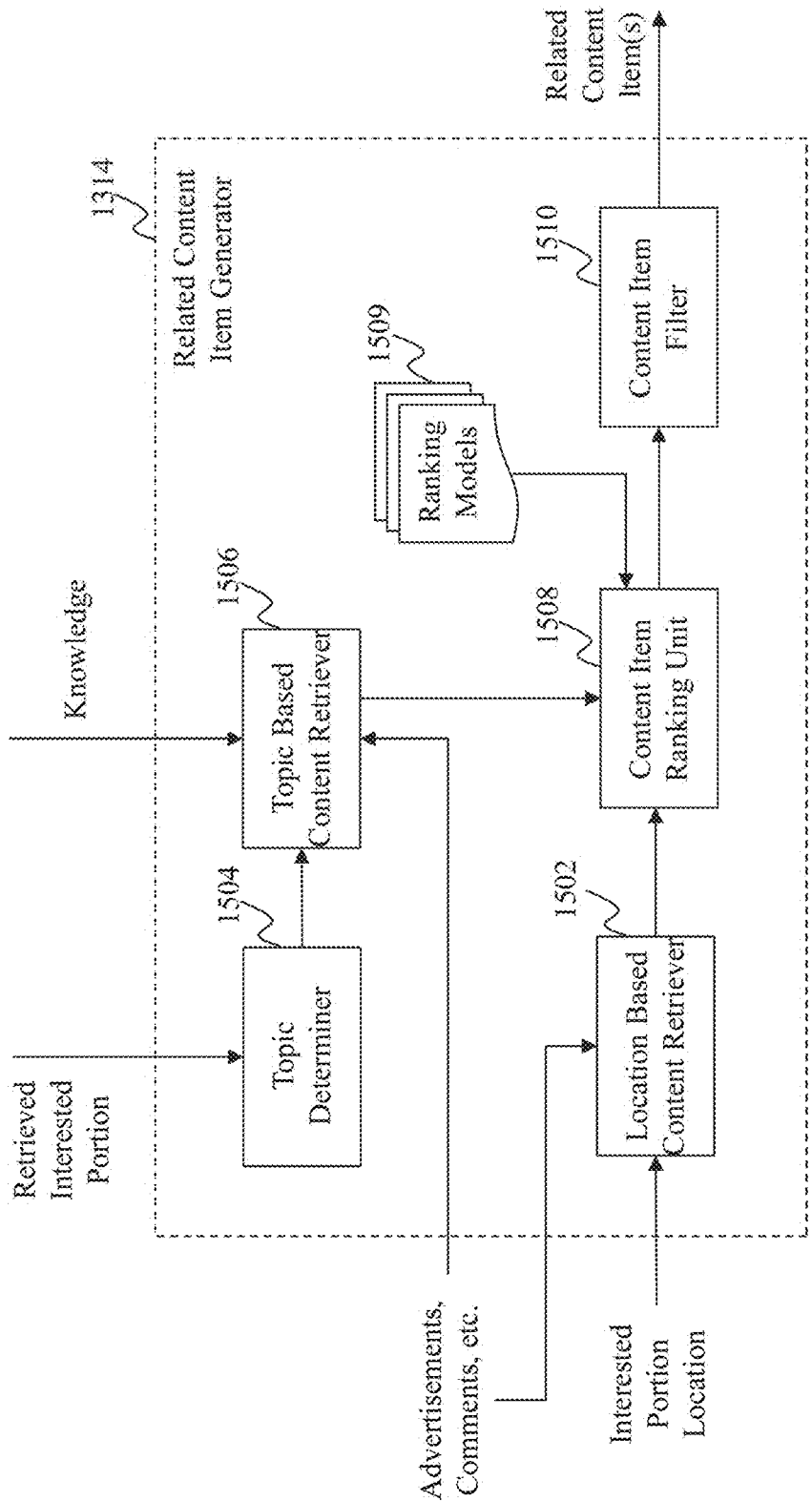
FIG. 15 illustrates an exemplary diagram of a related content item generator, according to an embodiment of the present teaching.

FIG. 15 illustrates an exemplary diagram of the related content item generator 1314, according to an embodiment of the present teaching. The related content item generator 1314 in this example includes a location based content retriever 1502, a topic determiner 1504, a topic based content retriever 1506, a content item ranking unit 1508, one or more ranking models 1509, and a content item filter 1510.

The location based content retriever 1502 in this example receives location of the interested portion of the content item that the user is accessing. Based on the location, the location based content retriever 1502 may retrieve additional content items related to the location, e.g. advertisements, comments, knowledge related to a sentence or paragraph. In this case, the location based content retriever 1502 does not need to know content of the interested portion. The additional content items retrieved by the location based content retriever 1502 might be previously marked to be related to the location in a database. The location based content retriever 1502 may send the retrieved content items to the content item ranking unit 1508 for ranking.

The topic determiner 1504 in this example receives the interested portion of the content item retrieved by the interested portion retriever 1312. Based on the retrieved interested portion, the topic determiner 1504 may determine one or more topics related to the portion. Based on the topics, the topic based content retriever 1506 may retrieve additional content items related to the topic, e.g. advertisements, comments, knowledge related to texts in a sentence or paragraph. For example, the topic based content retriever 1506 may retrieve an advertisement having a same or similar topic as the interested portion. For example, the topic based content retriever 1506 may retrieve a comment related to the topic of the interested portion. For example, the topic based content retriever 1506 may retrieve knowledge or background information related to the topic of the interested portion.

The content item ranking unit 1508 in this example may receive the retrieved content items from the topic determiner 1504 and the topic based content retriever 1506, and rank them. The content item ranking unit 1508 may select a ranking model 1509, e.g. based on experience or a machine learning scheme using user data for training. For example, based on a ranking model, the content item ranking unit 1508 may rank all content items retrieved based on location higher than all content items retrieved based on topic. In accordance with another ranking model, the content item ranking unit 1508 may rank all content items retrieved based on topic higher than all content items retrieved based on location. In other example, the content item ranking unit 1508 may determine a degree of relatedness between each content item and the interested portion, and rank the content items based on their respective degree of relatedness.

The content item filter 1510 in this example may filter the ranked content items, e.g. by removing one or more lower ranked content items. In one embodiment, the content item filter 1510 may remove no content item. In another embodiment, the content item filter 1510 may remove all content items, such that no related content item will be provided. After filtering, the content item filter 1510 may send the filtered content item(s) related to the interested portion to the presentation instructor 1316 for generating a presentation instruction.

Figure 16:
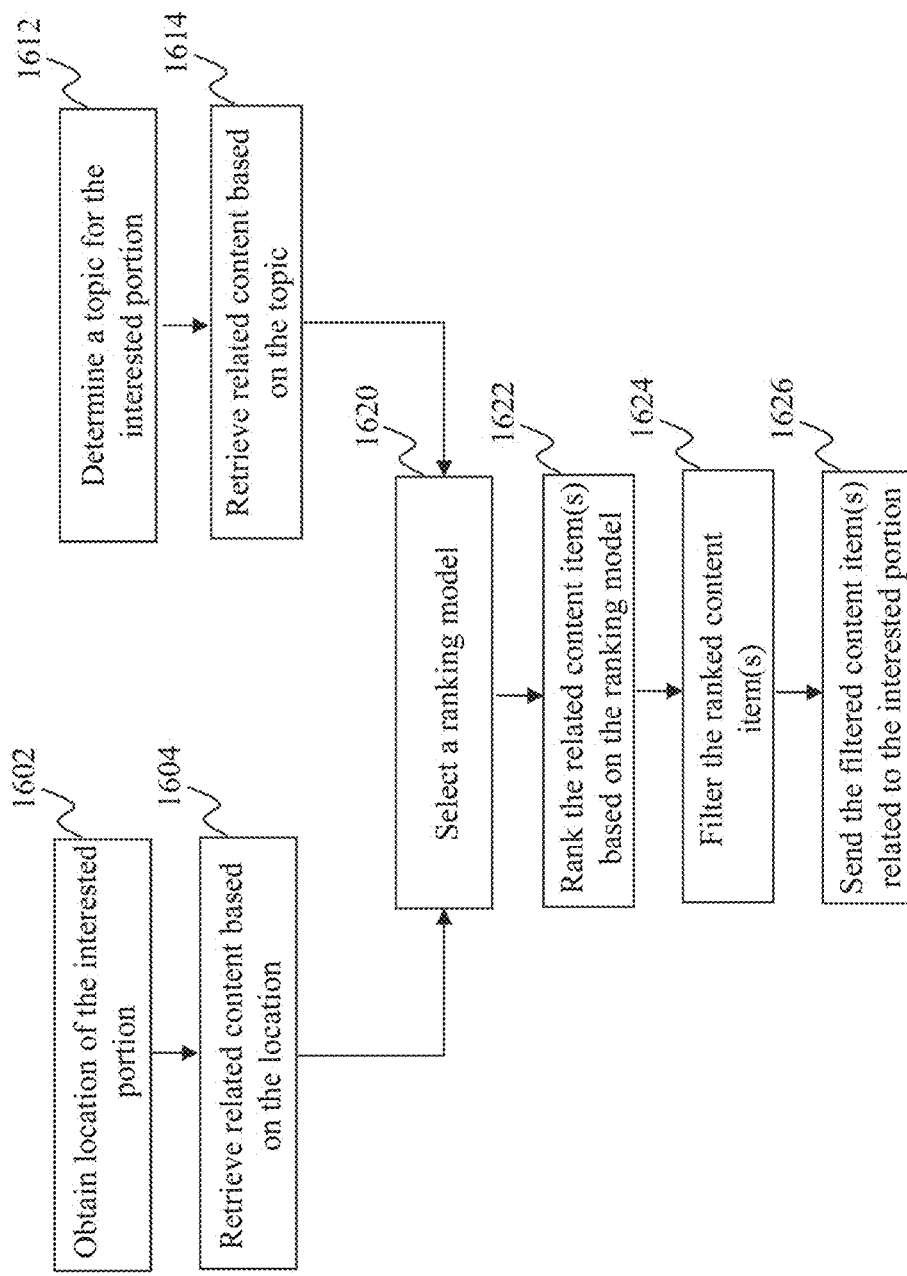
FIG. 16 is a flowchart of an exemplary process performed by a related content item generator, according to an embodiment of the present teaching.

FIG. 16 is a flowchart of an exemplary process performed by the related content item generator 1314, according to an embodiment of the present teaching. At 1602, location of the interested portion is obtained. At 1604, one or more related content items are retrieved based on the location. The process then moves to 1620.

At 1612, a topic is determined for the interested portion. At 1614, one or more related content items are retrieved based on the topic. The process then moves to 1620. It can be understood that the steps of 1602-1604 and the steps of 1612-1614 may be performed in parallel as shown in FIG. 16 or in serial.

At 1620, a ranking model is selected. At 1622, the related content item(s) are ranked based on the ranking model. At 1624, the ranked content item(s) are filtered, e.g. to remove content items ranked at the bottom. At 1626, the filtered content item(s) related to the interested portion are sent, e.g. to the presentation instructor 1316.

Figure 17:
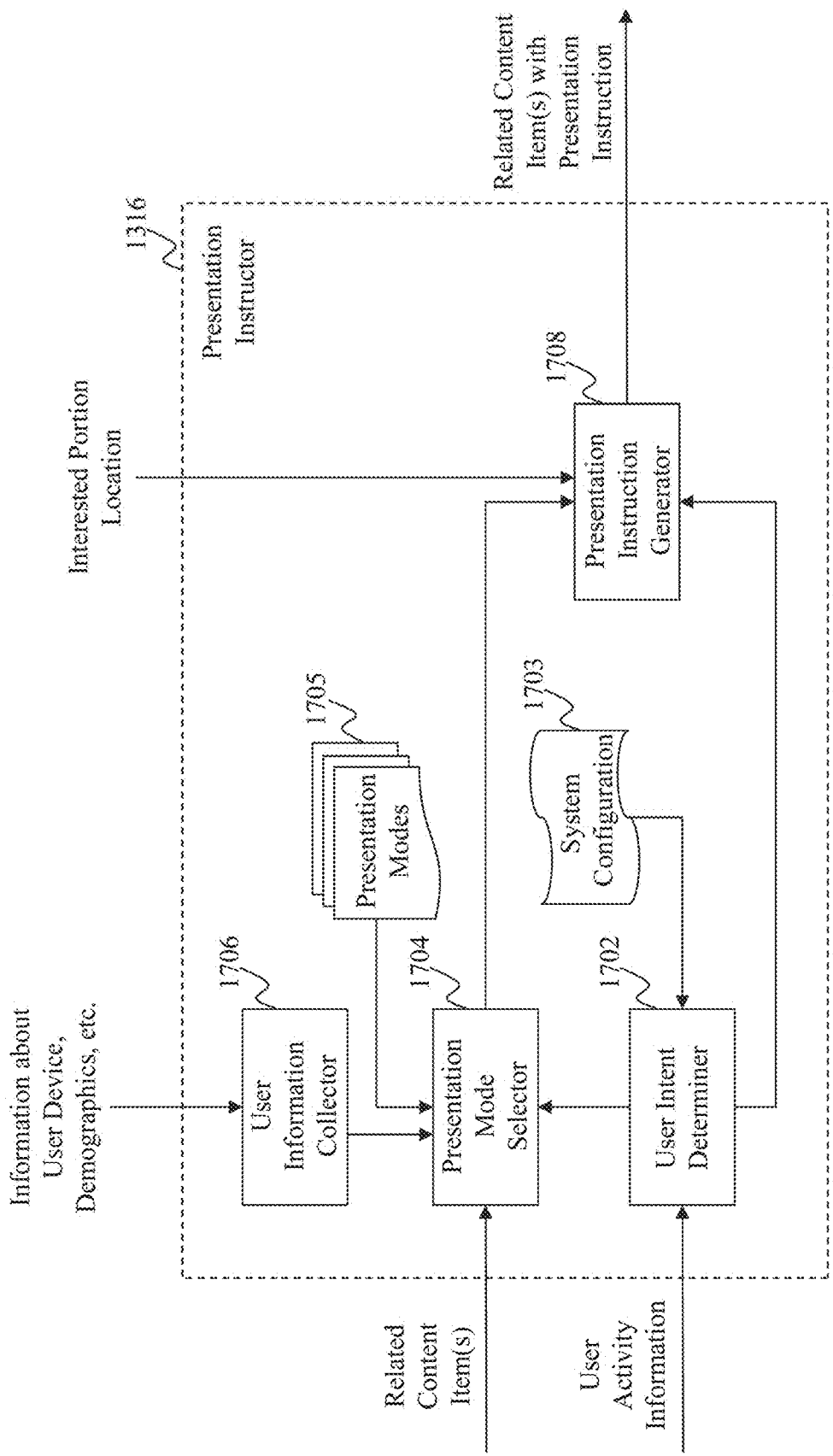
FIG. 17 illustrates an exemplary diagram of a presentation instructor, according to an embodiment of the present teaching.

FIG. 17 illustrates an exemplary diagram of the presentation instructor 1316, according to an embodiment of the present teaching. The presentation instructor 1316 in this example includes a user intent determiner 1702, system configuration 1703, a presentation mode selector 1704, one or more presentation modes 1705, a user information collector 1706, and a presentation instruction generator 1708.

The user intent determiner 1702 in this example receives and analyzes user activity information from the user to determine the user's intent, based on system configuration 1703. For example, the user may choose an option in the setting of the system to indicate that he/she prefers to see comments presented non-overlapping with the texts of a document. In that case, the user intent determiner 1702 may determine the user intended to see comments related to a sentence flying above or below the sentence, or presented in a separate window from the window including the document. When the user does not explicitly indicate his/her preference, the user intent determiner 1702 may collect user activity information from other users and determine a popular preference from other users as the user's potential intent. The user intent determiner 1702 may send the user's intent information to the presentation mode selector 1704 and the presentation instruction generator 1708.

The presentation mode selector 1704 in this example may select a presentation mode 1705, e.g. based on information about the user, the related content items, and/or the user's intent. The presentation mode selector 1704 may receive the user's intent from the user intent determiner 1702, receive the related content items from the related content item generator 1314, and receive information about the user from the user information collector 1706. The user information collector 1706 may collect information about the user, including the user's demographic information, the user's device information, and the user's other personal information. The user information collector 1706 may analyze the personal information and send it to the presentation mode selector 1704.

In one example, the user information collector 1706 may select a presentation mode for presenting related content items in a pop-up window, based on the user's intent. In another example, the user information collector 1706 may select a presentation mode for presenting related content items over the portion like a scrolling shooter, based on a limited screen size of the user's device. In yet another example, the user information collector 1706 may select a presentation mode for presenting related advertisements beside the portion as shown in FIG. 2F and FIG. 2G, based on characteristic or format of the advertisements. The presentation mode selector 1704 may send the selected presentation mode to the presentation instruction generator 1708 for generating a presentation instruction.

The presentation instruction generator 1708 in this example receives location of the interested portion from the user activity detection unit 1308 and generates a presentation instruction based on the selected presentation mode. For example, based on one presentation mode, the presentation instruction generator 1708 may generate an instruction for presenting one or more related content items with respect to the interested portion locator. For example, the instruction may indicate presenting comments related to Paragraph 1 below Paragraph 1; presenting advertisements related to Paragraph 2 on the right side of Paragraph 2; and presenting knowledge about Paragraph 3 in a pop-up window beside Paragraph 3. In this case, the user may have one or more interested portions in a document.

In one embodiment, the user is viewing a video and showing interests in some clip of the video. The presentation instruction generator 1708 may generate an instruction for presenting comments related to that clip in a scrolling shooter style, i.e. flying over the video, from one side to another.

The presentation instruction generator 1708 may send the related content item(s) with the generated presentation instruction to the publisher 302, or directly to the user's device. In the latter case, the browser on the user's device may follow the generated presentation instruction to present the related content item(s).

Figure 18:
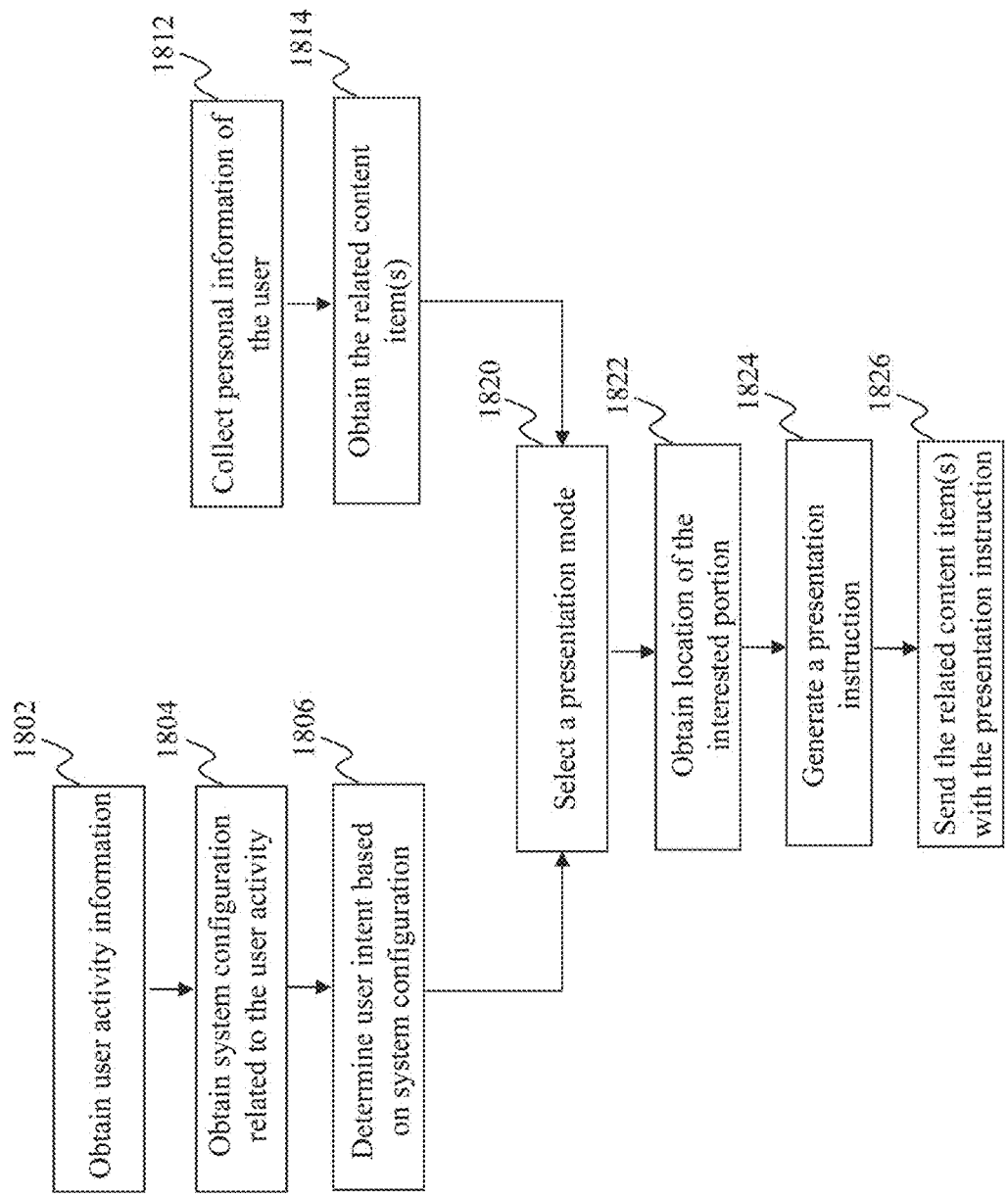
FIG. 18 is a flowchart of an exemplary process performed by a presentation instructor, according to an embodiment of the present teaching.

FIG. 18 is a flowchart of an exemplary process performed by the presentation instructor 1316, according to an embodiment of the present teaching. At 1802, user activity information is obtained. At 1804, system configuration related to the user activity is obtained. At 1806, user intent is determined based on system configuration. The process then moves to 1820.

In parallel to 1802-1806, at 1812, personal information of the user is collected. At 1814, the related content item(s) are obtained. The process then moves to 1820. It can be understood that the steps of 1802-1806 and the steps of 1812-1814 may be performed in parallel as shown in FIG. 18 or in serial.

At 1820, a presentation mode is selected. At 1822, location of the interested portion is obtained. At 1824, a presentation instruction is generated, e.g. based on the selected presentation mode and/or the location of the interested portion. At 1826, the related content item(s) are sent with the presentation instruction for providing the user interaction driven electronic social experience.

Figure 19:
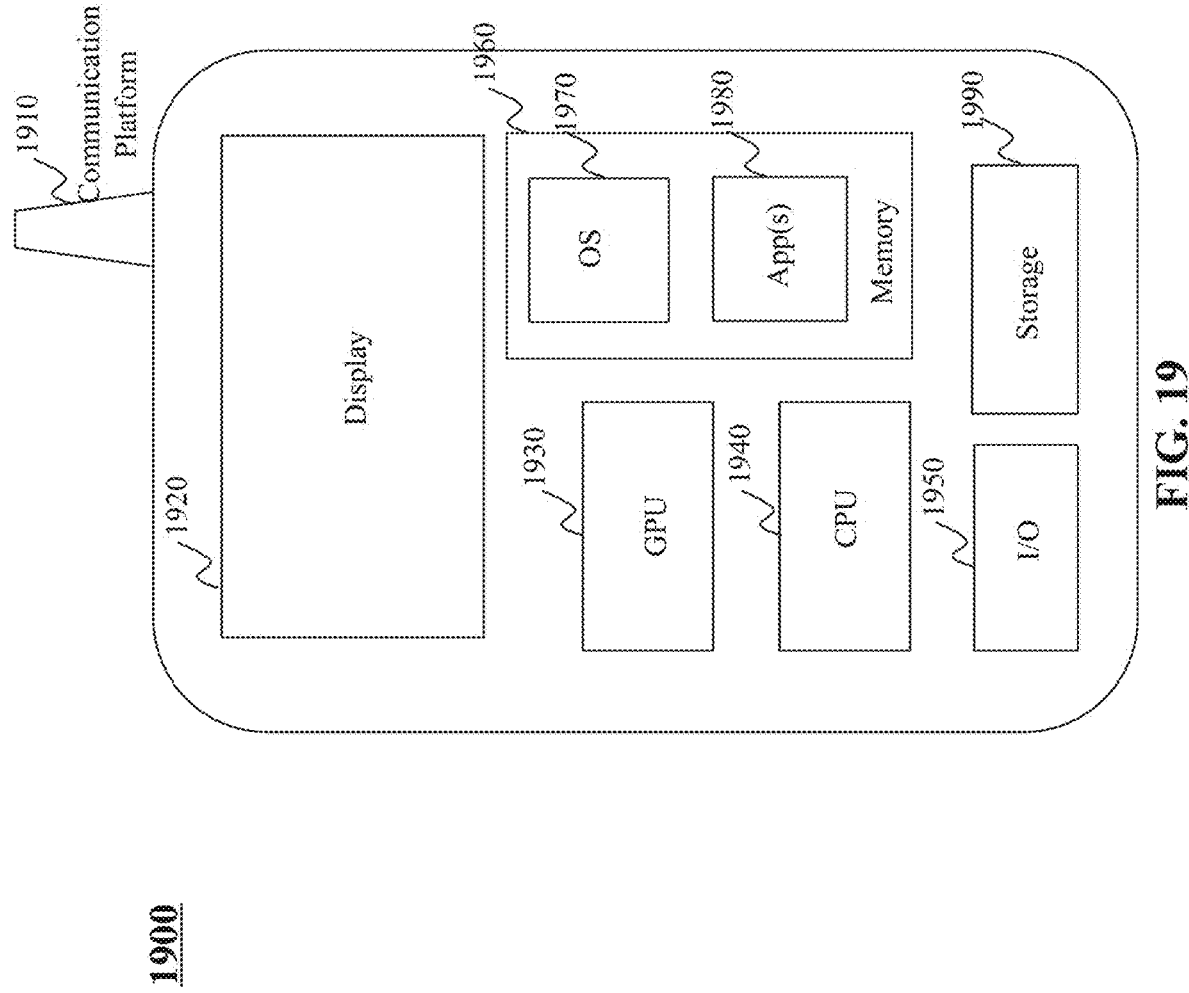
FIG. 19 depicts the architecture of a mobile device which can be used to implement a specialized system incorporating the present teaching.

FIG. 19 depicts the architecture of a mobile device which can be used to realize a specialized system implementing the present teaching. In this example, the user device on which content and advertisement are presented and interacted-with is a mobile device 1900, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1900 in this example includes one or more central processing units (CPUs) 1940, one or more graphic processing units (GPUs) 1930, a display 1920, a memory 1960, a communication platform 1910, such as a wireless communication module, storage 1990, and one or more input/output (I/O) devices 1950. Any other suitable component, including but not limited to a system bus or a controller (not shown), may also be included in the mobile device 1500. As shown in FIG. 19, a mobile operating system 1970, e.g., iOS, Android, Windows Phone, etc., and one or more applications 1980 may be loaded into the memory 1960 from the storage 1990 in order to be executed by the CPU 1940. The applications 1980 may include a browser or any other suitable mobile apps for receiving and rendering content streams and advertisements on the mobile device 1900. User interactions with the content streams and advertisements may be achieved via the I/O devices 1950 and provided to the publisher 302 and/or the interaction driven content provider 306, e.g., via the network 310.

To implement various modules, units, and their functionalities described in the present disclosure, computer hardware platforms may be used as the hardware platform(s) for one or more of the elements described herein (e.g., the publisher 302, the interaction driven content provider 306, and/or other components of systems 300 and 400 described with respect to FIGS. 1-18). The hardware elements, operating systems and programming languages of such computers are conventional in nature, and it is presumed that those skilled in the art are adequately familiar therewith to adapt those technologies to provide user interaction driven electronic social experience. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 20:
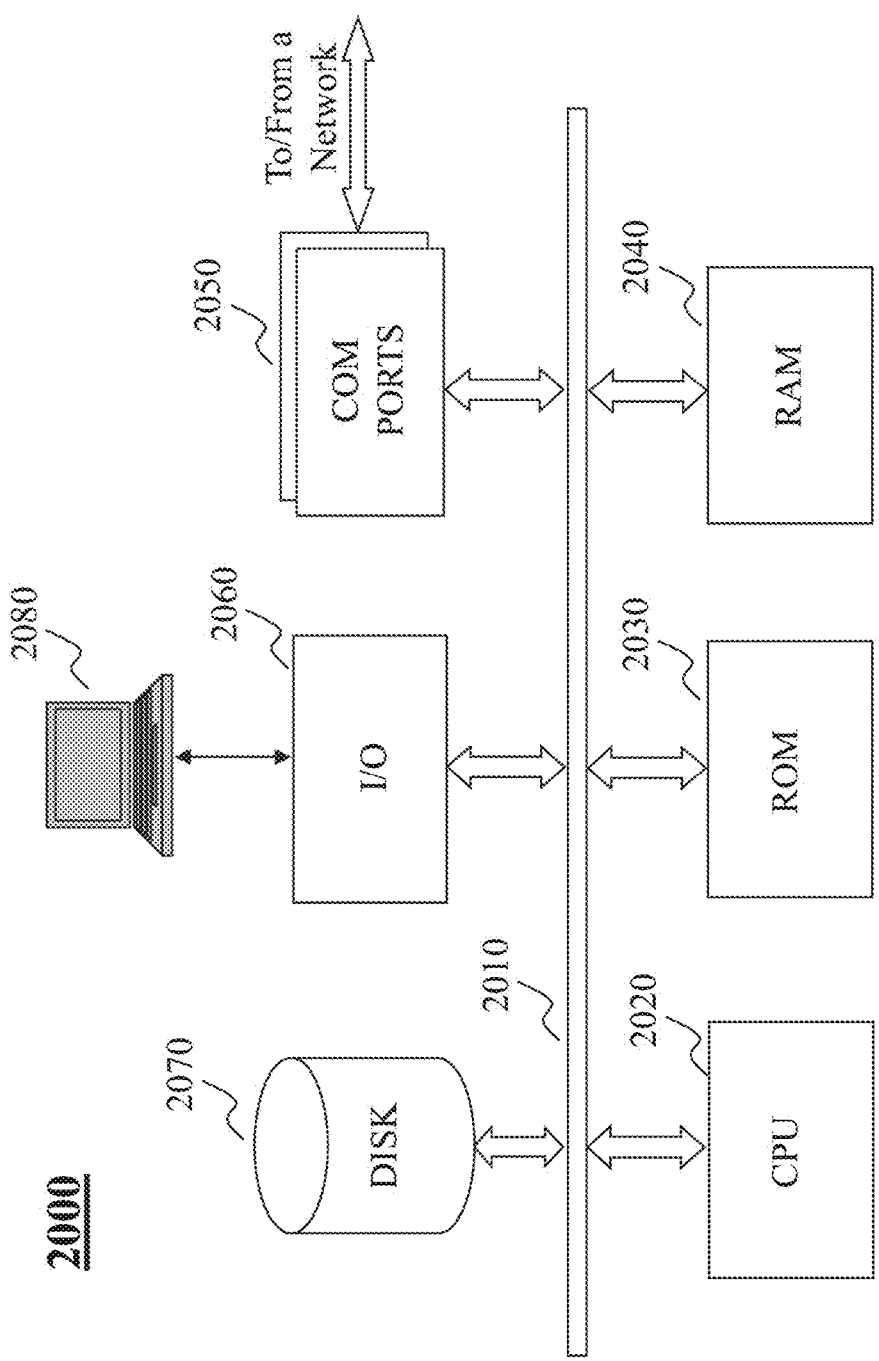
FIG. 20 depicts the architecture of a computer which can be used to implement a specialized system incorporating the present teaching.

FIG. 20 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 2000 may be used to implement any component of the interaction driven electronic socialization techniques, as described herein. For example, the interaction driven content provider 306, etc., may be implemented on a computer such as computer 2000, via its hardware, software program, firmware, or a combination thereof. Although only one such computer is shown, for convenience, the computer functions relating to interaction driven electronic socialization as described herein may be implemented in a distributed fashion on a number of similar platforms, to distribute the processing load.

The computer 2000, for example, includes COM ports 2050 connected to and from a network connected thereto to facilitate data communications. The computer 2000 also includes a central processing unit (CPU) 2020, in the form of one or more processors, for executing program instructions. The exemplary computer platform includes an internal communication bus 2010, program storage and data storage of different forms, e.g., disk 2070, read only memory (ROM) 2030, or random access memory (RAM) 2040, for various data files to be processed and/or communicated by the computer, as well as possibly program instructions to be executed by the CPU. The computer 2000 also includes an I/O component 2060, supporting input/output flows between the computer and other components therein such as user interface elements 2080. The computer 2000 may also receive programming and data via network communications.

Hence, aspects of the methods of provide user interaction driven electronic social experience, as outlined above, may be embodied in programming Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other interaction driven content provider into the hardware platform(s) of a computing environment or other system implementing a computing environment or similar functionalities in connection with provide user interaction driven electronic social experience. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the interaction driven electronic socialization as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for providing interaction driven electronic social experience, comprising:
presenting a first content item to the user on a mobile device;
receiving, via the communication platform and from the mobile device, first information indicating a physical movement of the mobile device, representing the user's desire for activating a function offering an interaction driven electronic social experience, by which additional content related to the first content item is provided to the user when it is observed that the user is interested in the first content item; and
in the event that the function is activated, providing the interaction driven electronic social experience to the user by:
obtaining second information on user interaction with the first content item, wherein the second information is used to estimate
a portion of the first content item that the user is interested in;
obtaining a second content item related to the portion of the first content item selected based on one or more topics related to the portion;
generating third information based on the user interaction with respect to the first content item, wherein the third information indicates how the first content item and the second content item are to be presented together to the user; and
providing the second content item with the third information to the mobile device so that the second content item is to be presented with respect to the portion of the first content item.

2. The method of claim 1, wherein obtaining the second content item related to the portion of the first content item comprises:
determining fourth information indicating the one or more topics related to the portion of the first content item or a location of the portion in the first content item; and
retrieving one or more content items based on the fourth information, the second content item being selected from the one or more content items.

3. The method of claim 2, further comprising:
obtaining a ranking model;
ranking the one or more content items based on the ranking model; and
providing the one or more content items with fifth information indicating that the one or more content items are to be presented according to their respective rankings with respect to the portion of the first content item, wherein the second content item is selected based on the fifth information.

4. The method of claim 1, wherein the second content item comprises at least one of: a comment, an advertisement, knowledge, video, audio, image, or text.

5. The method of claim 1, wherein the third information further indicates a manner that the second content item is to be presented together with the first content item, the manner comprising one of:
flying over the portion of the first content item;
flying between lines of text in the portion of the first content item;

flying between the portion and a portion next to the portion in the first content item;
static beside the portion of the first content item; or
static in a layer separate from the portion of the first content item.

6. The method of claim 1, wherein the third information is further determined based on the first information, personal information about the user, or the first information and the personal information about the user.

7. The method of claim 1, wherein the first information further indicates an input via the mobile device from the user in form of text, voice, image, or video.

8. A method, implemented on a machine having at least one processor, storage, and a communication platform connected to a network for providing interaction driven electronic social experience, comprising:
providing a first content item to a user on a mobile device, wherein the mobile device is configured to display the first content item;
receiving first information indicating a physical movement of the mobile device, representing the user's desire for activating a function offering an interaction driven electronic social experience, by which additional content related to the first content item is provided to the user when it is observed that the user is interested in the first content item;
in the event that the function is activated, providing the interaction driven electronic social experience to the user by:
receiving second information on user interaction with the first content item displayed via the mobile device, wherein
the second information is used to estimate a portion of the first content item to be viewed by the user;
receiving a second content item and third information, the second content item being identified based on one or more topics related to the portion of the first content item, wherein:
the third information is generated based on the first information, the second information, or the first information and the second information,
the third information indicates that the first content item and the second content item are to be presented together to the user, and
the third information indicates how the second content item is to be presented with respect to the portion of the first content item; and
providing, to the mobile device, the second content item with the third information, wherein the mobile device is configured to display the first content item and the second content item based on the third information.

9. The method of claim 8, further comprising:
adjusting a presentation of the portion of the first content item to be viewed by the user based on the second information.

10. The method of claim 9, wherein adjusting comprises at least one of:
causing the portion of the first content item to be presented one of transparent, semi-transparent, or shaded;
enlarging a space between the portion of the first content item and a portion next to the portion of the first content item; or
providing a layer separate from the portion of the first content item.

11. The method of claim 8, further comprising:
obtaining an input from the user based on the second information, wherein the second content item is generated based on the input.

12. The method of claim 8, wherein determining the portion of the first content item comprises:
obtaining a comment based on the second information;
determining the one or more topics based on the comment; and
identifying the portion of the first content item based on the one or more topics.

13. The method of claim 8, wherein the physical movement comprises one of:
turning the mobile device back and forth;
rotating the mobile device;
moving the mobile device farther away from the user;
moving the mobile device closer to the user; or
shaking the mobile device.

14. A system having at least one processor, storage, and a communication platform connected to a network for providing interaction driven electronic social experience, the system comprising:
a content provider configured for presenting a first content item to the user on a mobile device;
a request receiver configured for receiving, via the communication platform and from the mobile device, first information indicating a physical movement of the mobile device, representing the user's desire for activating a function offering an interaction driven electronic social experience, by which additional content related to the first content item is provided to the user when it is observed that the user is interested in the first content item;
an activity detection unit configured for in the event that the function is activated, obtaining second information on user interaction with the first content item, wherein the second information is used to estimate
a portion of the first content item that the user is interested in;
a related content item generator configured for obtaining a second content item selected based on one or more topics related to the portion; and
a presentation instructor configured for:
generating third information based on the user interaction with respect to the first content item, wherein the third information indicates how the first content item and the second content item are to be presented together to the user, and
providing the second content item with the third information to the mobile device so that the second content item is to be presented with respect to the portion of the first content item.

15. The system of claim 14, wherein the related content item generator comprises:
a topic based content retriever configured for retrieving a first set of content items based on the one or more topics related to the portion;
a location based content retriever configured for retrieving a second set of content items based on a location of the portion in the first content item, wherein the second content item is selected from the first set of content items or the second set of content items.

16. The system of claim 15, wherein:
the related content item generator further comprises a content item ranking unit configured for ranking the first set of content items and the second set of content items based on a ranking model; and the presentation instructor is further configured for providing the first set of content items and the second set of content items with fourth information indicating that the first set of content items and the second set of content items are to be presented according to their respective rankings with respect to the portion of the first content item, wherein the second content item is selected based on the fourth information.

17. The system of claim 14, wherein the third information further indicates a manner that the second content item is to be presented together with the first content item, the manner comprising one of:
flying over the portion of the first content item;
flying between lines of text in the portion of the first content item;
flying between the portion and a portion next to the portion in the first content item;
static beside the portion of the first content item; or
static in a layer separate from the portion of the first content item.

18. A system having at least one processor, storage, and a communication platform connected to a network for providing interaction driven electronic social experience, the system comprising:
a content provider configured for providing a first content item to a user on a mobile device, wherein the mobile device is configured to display the first content item;
a user activity detection unit configured for receiving first information indicating a physical movement of the mobile device, representing the user's desire for activating a function offering an interaction driven electronic social experience, by which additional content related to the first content item is provided to the user when it is observed that the user is interested in the first content item;
an activity analyzer configured for
in the event that the function is activated,
receiving second information on user interaction with the first content item,
wherein the second information is used to estimate a portion of the first content item to be viewed by the user; and
a related content item receiver configured for:
receiving a second content item with third information, the second content item selected based on on one or more topics related to the portion, wherein:
the third information is generated based on the information, the second information, or the first information and the second information,
the third information indicates that the first content item and the second content item are to be presented together to the user, and
the third information indicates how the second content item is to be presented with respect to the portion of the first content item, and wherein the content provider is further configured for:
providing, to the mobile device, the second content item with the third information, wherein the mobile device is configured to display the first content item and the second content item based on the third information.

19. The system of claim 18, further comprising:
a content presentation modifier configured for adjusting a presentation the portion of the first content item to be viewed by the user based on the second information.

20. The system of claim 19, wherein the portion of the first content item being adjusted comprises at least one of:
causing the portion of the first content item to be presented one of transparent, semi-transparent, or shaded;
enlarging space between the portion of the first content item and a portion next to the portion of the first content item; or
providing a layer separate from the portion of the first content item.

21. The system of claim 18, further comprising:
a user input analyzer configured for obtaining an input from the user based on the second information; and
a comment formation unit configured for generating the second content item based on the input.

22. A machine-readable tangible and non-transitory medium having computer program instructions stored thereon for providing interaction driven electronic social experience, wherein the computer program instructions, when read by the machine, effectuate operations comprising:
presenting a first content item to the user on a mobile device;
receiving, from the mobile device, first information indicating a physical movement of the mobile device, representing the user's desire for activating a function offering an interaction driven electronic social experience, by which additional content related to the first content item is provided to the user when it is observed that the user is interested in the first content item; and
in the event that the function is activated, providing the interaction driven electronic social experience to the user by:
obtaining second information on user interaction with the first content item, wherein the second information is used to estimate
a portion of the first content item that the user is interested in;
obtaining a second content item related to the portion of the first content item selected based on one or more topics related to the portion;
generating third information based on the user interaction with respect to the first content item, wherein the third information indicates how the first content item and the second content item are to be presented together to the user; and
providing the second content item with the third information to the mobile device so that the second content item is to be presented with respect to the portion of the first content item.

23. A machine-readable tangible and non-transitory medium having computer program instructions stored thereon for providing interaction driven electronic social experience, wherein the computer program instructions, when read by the machine, effectuate operations comprising:
providing a first content item to a user on a mobile device, wherein the mobile device is configured to display the first content item;
receiving first information indicating a physical movement of the mobile device, representing the user's desire for activating a function offering an interaction driven electronic social experience, by which additional content related to the first content item is provided to the user when it is observed that the user is interested in the first content item;
in the event that the function is activated, providing the interaction driven electronic social experience to the user by:
receiving second information on user interaction with the first content item, wherein the second information is used to estimate a portion of the first content item to be viewed by the user;

receiving a second content item with third information, the second content item being selected based on one or more topics related to the portion, wherein:
- the third information is generated based on the first information, the second information, or the first information and the second information,
- the third information indicates that the first content item and the second content item are to be presented together to the user, and
- the third information indicates how the second content item is to be presented with respect to the portion of the first content item; and providing, to the mobile device, the second content item with the third information, wherein the mobile device is configured to display the first content item and the second content item based on the third information.

\* \* \* \* \*